US009431907B2

(12) United States Patent
Michishita

(10) Patent No.: US 9,431,907 B2
(45) Date of Patent: Aug. 30, 2016

(54) SWITCHING REGULATOR INCORPORATING OPERATION MONITOR

(71) Applicant: Yuusuke Michishita, Toyonaka (JP)

(72) Inventor: Yuusuke Michishita, Toyonaka (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 0 days.

(21) Appl. No.: 14/461,554

(22) Filed: Aug. 18, 2014

(65) Prior Publication Data
US 2015/0061615 A1 Mar. 5, 2015

(30) Foreign Application Priority Data
Aug. 27, 2013 (JP) .................................. 2013-175714

(51) Int. Cl.
H02M 3/158 (2006.01)
H02M 1/00 (2006.01)

(52) U.S. Cl.
CPC ... H02M 3/1588 (2013.01); H02M 2001/0032 (2013.01); Y02B 70/1466 (2013.01); Y02B 70/16 (2013.01)

(58) Field of Classification Search
CPC ..................... H02M 3/155; H02M 2001/0009; H02M 2001/0025; H02M 2001/0032
See application file for complete search history.

(56) References Cited

U.S. PATENT DOCUMENTS

| | | | | |
|---|---|---|---|---|
| 5,481,178 A | * | 1/1996 | Wilcox et al. | 323/287 |
| 6,724,174 B1 | * | 4/2004 | Esteves et al. | 323/224 |
| 8,441,239 B2 | * | 5/2013 | Miyamae | 323/271 |
| 9,048,734 B2 | * | 6/2015 | Qin | |
| 9,071,135 B2 | * | 6/2015 | Chen et al. | |
| 2006/0208717 A1 | * | 9/2006 | Shimizu et al. | 323/284 |
| 2006/0220629 A1 | * | 10/2006 | Saito et al. | 323/282 |
| 2008/0030178 A1 | * | 2/2008 | Leonard et al. | 323/282 |
| 2008/0061755 A1 | * | 3/2008 | Michishita | 323/282 |
| 2008/0067989 A1 | * | 3/2008 | Kasai et al. | 323/271 |
| 2008/0174286 A1 | * | 7/2008 | Chu et al. | 323/271 |
| 2008/0197828 A1 | * | 8/2008 | Michishita | 323/282 |
| 2009/0174384 A1 | * | 7/2009 | Michishita et al. | 323/285 |
| 2009/0201000 A1 | * | 8/2009 | Kojima et al. | 323/282 |
| 2009/0243568 A1 | * | 10/2009 | Nguyen | 323/274 |
| 2009/0302820 A1 | * | 12/2009 | Shimizu et al. | 323/285 |
| 2009/0322299 A1 | * | 12/2009 | Michishita et al. | 323/282 |
| 2010/0066328 A1 | * | 3/2010 | Shimizu et al. | 323/282 |
| 2011/0018516 A1 | * | 1/2011 | Notman et al. | 323/284 |
| 2011/0043176 A1 | * | 2/2011 | Sohma | 323/282 |
| 2011/0169464 A1 | * | 7/2011 | Michishita et al. | 323/271 |
| 2011/0193543 A1 | * | 8/2011 | Nguyen | 323/285 |
| 2011/0227549 A1 | * | 9/2011 | Huang et al. | 323/282 |
| 2011/0234188 A1 | * | 9/2011 | Chiu et al. | 323/282 |
| 2011/0267015 A1 | * | 11/2011 | Lu et al. | 323/235 |
| 2012/0038341 A1 | * | 2/2012 | Michishita et al. | 323/284 |
| 2012/0049829 A1 | * | 3/2012 | Murakami | 323/288 |
| 2012/0056610 A1 | * | 3/2012 | Kimura | 323/351 |
| 2012/0062191 A1 | * | 3/2012 | Goto | 323/271 |
| 2012/0062196 A1 | * | 3/2012 | Chen et al. | 323/282 |
| 2013/0119953 A1 | * | 5/2013 | Murase | 323/271 |
| 2013/0208520 A1 | * | 8/2013 | Michishita | 363/84 |
| 2014/0062433 A1 | * | 3/2014 | Zhou et al. | 323/271 |

FOREIGN PATENT DOCUMENTS

| | | |
|---|---|---|
| JP | 2007-174884 | 7/2007 |
| JP | 2011-078212 | 4/2011 |
| JP | 2012-060854 | 3/2012 |

* cited by examiner

Primary Examiner — Timothy J Dole
Assistant Examiner — Yusef Ahmed
(74) Attorney, Agent, or Firm — Cooper & Dunham LLP

(57) ABSTRACT

A switching regulator includes a first switching element and a second switching element in a pair to be switched over to convert an input voltage to a certain constant voltage, and an operation monitor to monitor an operation state of the first switching element, in which a switching of the second switching element is changed according to a result of the monitoring by the operation monitor.

4 Claims, 15 Drawing Sheets

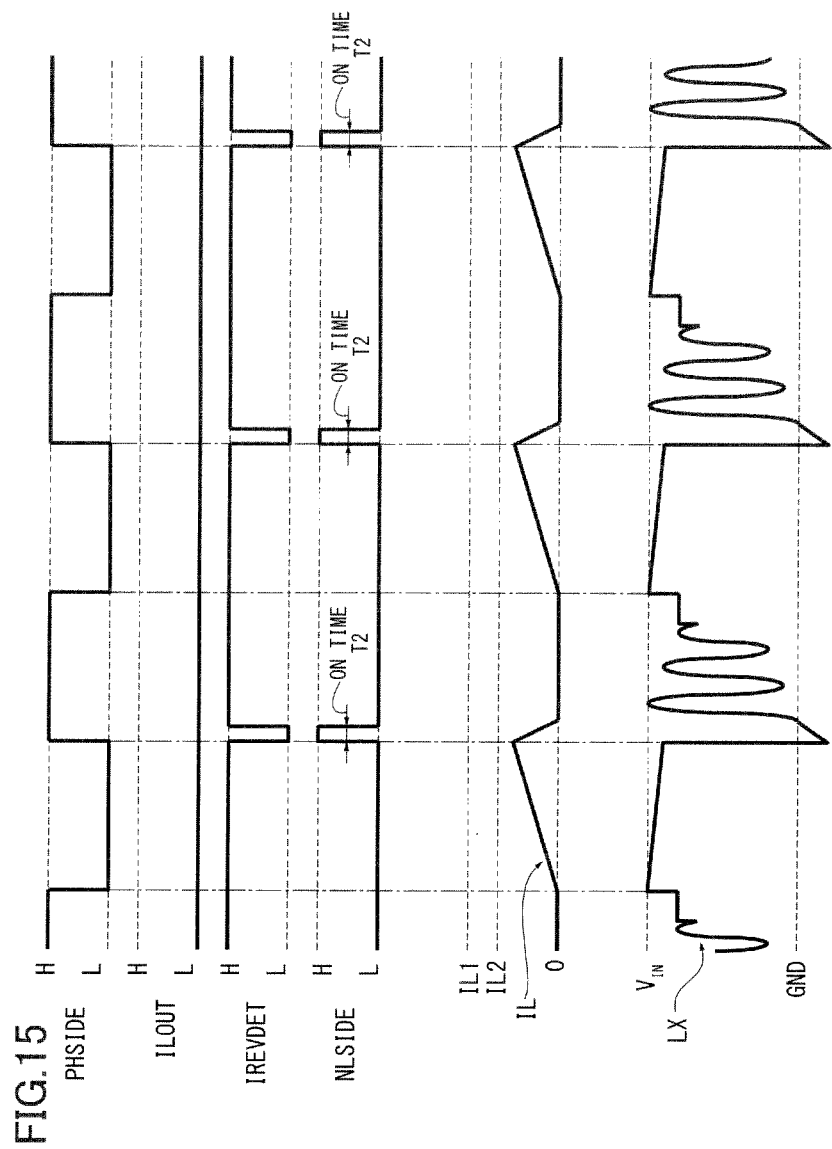

SWITCHING REGULATOR INCORPORATING OPERATION MONITOR

CROSS REFERENCE TO RELATED APPLICATION

The present application is based on and claims priority from Japanese Patent Application No. 2013-175714, filed on Aug. 27, 2013, the disclosure of which is hereby incorporated by reference in its entirety.

BACKGROUND OF THE INVENTION

1. Field of the Invention

The present invention relates to a switching regulator which can improve operation efficiency during a light load.

2. Description of the Prior Art

In recent years there have been demands for electronic devices to save power in view of environmental concerns. Such demands are especially strong for battery-driven electronic devices. To advance power saving, it is important in general to reduce the power consumption of an electronic device and reduce unnecessary power consumption thereof by enhancing the efficiency of a power supply circuit. To realize the latter, a high-efficiency power supply circuit used for small-size electronic device has been developed. For example, a non-isolated switching regulator incorporating an inductor has been widely used.

There are mainly two controlling methods for such a switching regulator. One is a PWM (Pulse Width Modulation) mode and the other is a VFM (Variable Frequency Modulation) mode. In PWM mode output voltage is controlled to be constant by changing a duty ratio of an output signal (pulse wave) with a certain frequency in accordance with a change in a load or input voltage. In VFM mode output voltage is controlled to be constant by changing a frequency (cycle) of an output signal in accordance with a change in a load or input voltage. The VFM mode is also referred to as PFM (Pulse Frequency Modulation) mode.

The power consumption of a switching regulator increases in proportion to a switching frequency, that is, the number of times at which a switching transistor is turned on and off. In the PWM mode, a power loss by a periodic on-off control of a switching transistor degrades the efficiency of the switching regulator during a light load. Meanwhile, in the VFM mode the frequency of the switching regulator varies according to a load so that the switching frequency can be lowered during a light load. Accordingly, the efficiency of the switching regulator is higher in the VFM mode than in the PWM mode during a light load. Thus, during a heavy load, the switching regulator is placed in the PWM mode with merits taken into consideration while it is placed in the VFM mode during a light load.

With occurrence of reverse current in the inductor, however, the switching regulator cannot lower the switching frequency to a desired value. In view of this, in the VFM mode the switching elements of the switching regulator are disconnected to prevent a reverse flow of current in the inductor. Japanese Patent No. 4031507, for example, discloses such a switching regulator which detects an indication of occurrence of reverse current and disconnects a second switching element and a ground terminal to prevent the reverse current from flowing into the inductor.

However, in the above switching regulator reverse current may still occur in the inductor depending on a condition of input or output voltage. Thus, the switching regulator cannot decrease the switching frequency as much as it aims to. In the worst case it becomes unable to operate in the VFM mode, decreasing the efficiency thereof during a light load.

SUMMARY OF THE INVENTION

The present invention aims to provide a switching regulator which can prevent the occurrence of reverse current in an inductor irrespective of a condition of input or output voltage and improve the efficiency during a light load.

According to one embodiment, a switching regulator comprises a first switching element and a second switching element in a pair to be switched over to convert an input voltage to a certain constant voltage, and an operation monitor to monitor an operation state of the first switching element, wherein a switching of the second switching element is changed according to a result of the monitoring by the operation monitor.

BRIEF DESCRIPTION OF THE DRAWINGS

Features, embodiments, and advantages of the present invention will become apparent from the following detailed description with reference to the accompanying drawings:

FIG. 15 is a timing chart showing a variation (waveform) in the signals of the switching regulator 104 when a difference between input voltage $V_{IN}$ and output voltage $V_{OUT}$ is small.

DETAILED DESCRIPTION OF THE PREFERRED EMBODIMENT

Hereinafter, embodiments of a switching regulator according to the present invention will be described in detail with reference to the accompanying drawings. Wherever possible, the same reference numbers will be used throughout the drawings to refer to the same or like parts.

First Embodiment

Figure 1:
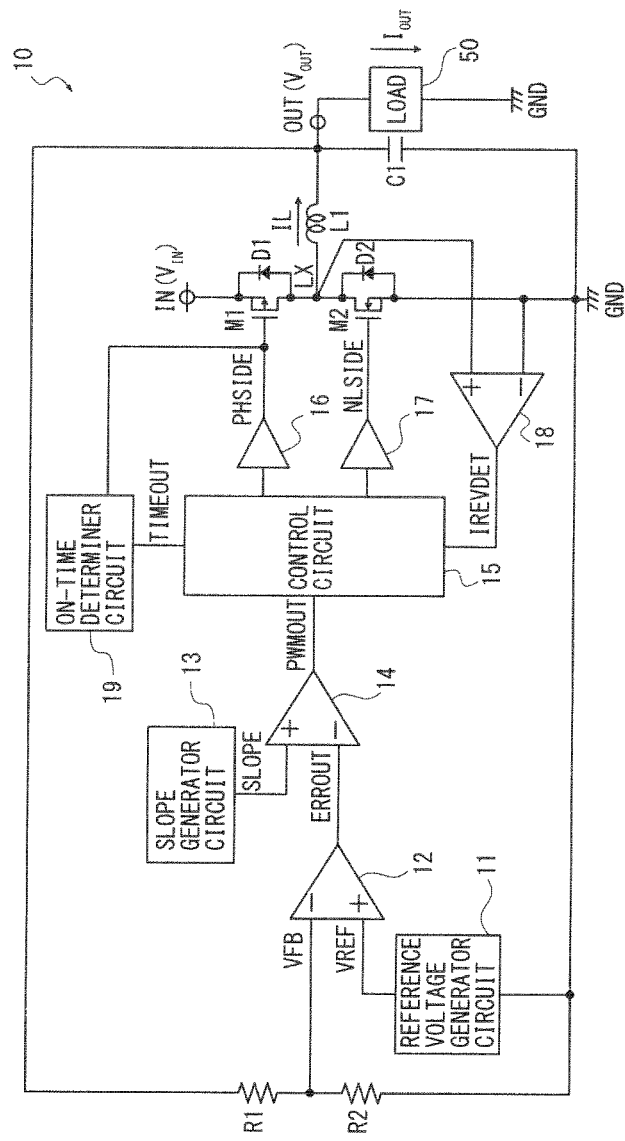
FIG. 1 shows the structure of a switching regulator 10 according to a first embodiment.

The structure of a switching regulator according to the first embodiment is described referring to FIG. 1. The switching regulator is a synchronous rectifier type configured to receive an input voltage $V_{IN}$ at an input terminal IN, convert it to a certain constant voltage and output it as an output voltage $V_{OUT}$ from an output terminal OUT to a load 50.

The switching regulator 10 comprises a first switching transistor M1 as a first switching element and a second switching transistor M2 as a second switching element. The first and second switching transistors M1, M2 are paired to conduct switching operation for output control over the input voltage $V_{IN}$. By switching by the first and second switching transistors M1, M2, the input voltage $V_{IN}$ to the input terminal IN is converted to a certain constant output voltage and output from the output terminal OUT as the output voltage $V_{OUT}$.

The first switching transistor M1 comprises a PMOS transistor and operates by a gate signal PHSIDE generated by a control circuit 15 and a high-side driver buffer circuit 16 as described later. The first switching transistor M1 is turned on by the gate signal's turning from high to low, establishing continuity between its source and drain while it is turned off by the gate signal's turning from low to high, disconnecting between the source and drain. The first switching transistor M1 is connected at the source and a back gate to the input terminal IN and connected at a drain to a later-described switching output LX. Thus, it includes a parasite diode D1 as a built-in diode between the drain (switching output LX) and back gate (input terminal IN).

The second switching transistor M2 comprises an NMOS transistor and operates by a gate signal NLSIDE generated by the control circuit 15 and a low-side driver buffer circuit 17. The second switching transistor M2 is turned on by the gate signal's turning from low to high, establishing continuity between its source and drain while it is turned off by the gate signal's from high to low, disconnecting between the source and drain. The second switching transistor M2 is connected at a source and a back gate to a ground level (ground terminal) and connected at a drain to the switching output LX. Thus, it includes a parasite diode D2 as a built-in diode between the ground level (switching output LX) and back gate (input terminal IN).

The first and second switching transistors M1, M2 are connected in series between the input terminal IN and ground level, sharing the drains. Instead of connecting to the ground level, the second switching transistor M2 can be connected to a referential potential or reference potential terminal of an electronic circuit of the switching regulator 10. A connect point between the first and second switching transistors M1, M2 is the switching output LX.

The switching regulator 10 further comprises an inductor L1, a condenser C1, a resistor R1, a resistor R2, a reference voltage generator circuit 11, an error amplifier 12, a slope generator circuit 13, a PWM comparator 14, a control circuit 15, a high-side driver buffer circuit 16, a low-side driver buffer circuit 17, a reverse current detecting comparator 18, and an on-time determiner circuit 19. Alternatively, the switching regulator 10 can be an integrated circuit IC excluding the inductor L1 and condenser C1 or an integrated circuit IC excluding the inductor L1, condenser C1, and first and second switching transistors M1, M2.

The inductor L1 is connected between the switching output LX and output terminal OUT. Between the output terminal OUT and ground level the resistor R1 and resistor R2 in series and the smoothing condenser C1 are connected. The inductor L1 and condenser C1 form a smoothing circuit to smoothen the output voltage $V_{OUT}$ from the output terminal OUT. The resistors R1, R2 are provided to detect and divide the output voltage to generate a feedback voltage VFB. The feedback voltage VFB is set to $[R2/(R1+R2)] \times V_{OUT}$. An inverse input terminal (negative terminal) of the error amplifier 12 is connected between the resistors R1, R2.

The reference voltage generator circuit 11 generates a certain reference voltage VREF for output. The reference voltage VREF is set corresponding to the feedback voltage VFB generated by the resistors R1. R2 in order to determine whether or not the output voltage $V_{OUT}$ is a predetermined value. The reference voltage generator circuit 11 is connected at one end to the ground level and at the other end to a non-inverse input terminal (positive terminal) of the error amplifier 12.

The error amplifier 12 amplifies a difference between the voltages input to the non-inverse and inverse input terminals to generate an output ERROUT for output. It is connected at an output terminal to an inverse input terminal (negative terminal) of the PWM comparator 14 and outputs the output ERROUT thereto.

The slope generator circuit 13 generates a certain slope voltage SLOPE for output. It is connected at an output terminal to a non-inverse input terminal (positive terminal) of the PWM comparator 14.

The PWM comparator 14 compares the output ERROUT and slope voltage SLOPE input to the non-inverse and inverse input terminals and generates an output PWMOUT used for PWM control. An output terminal of the PWM comparator 14 is connected to the control circuit 15. When the output ERROUT reaches the slope voltage SLOPE, the PWM comparator 14 turns the output PWMOUT from high to low after a certain delay time. Also, when the output ERROUT goes smaller than the voltage SLOPE, the PWM comparator 14 turns the PWMOUT from low to high after a certain delay time.

The control circuit 15 and the high-side driver buffer circuit 16 generate a gate signal PHSIDE on the basis of the output PWMOUT from the PWM comparator 14 and output it to the first switching transistor M1. The high-side driver buffer circuit 16 is connected at an input terminal to the control circuit 15 and at an output terminal to the gate of the first switching transistor M1. When the output PWMOUT from the PWM comparator 14 changes from high to low, the control circuit 15 and the high-side driver buffer circuit 16 turn the gate signal PHSIDE from high to low after a certain delay time. This places the first switching transistor M1 in the on-state and establishes continuity between the source and drain.

Further, the control circuit 15 and high-side driver buffer circuit 16 turn the gate signal PHSIDE from low to high when the inductor current IL of the inductor L1 reaches an OFF current threshold or the time from the turning-on of the first switching transistor M1 reaches an OFF time threshold. Thereby, the first switching transistor M1 is turned off and continuity between the source and drain is disconnected. Although not shown, the OFF current threshold is set to a larger value than a second current value IL2 (FIG. 2 and else) set by a reverse current comparator 18. The OFF time threshold is set to a longer time than a determination time T1 (FIG. 3 and else) set by an on-time determiner circuit 19.

Moreover, the control circuit 15 and the low-side driver buffer circuit 17 generate a gate signal NLSIDE on the basis of the PWMOUT from the PWM comparator 14 and output it to the second switching transistor M2. The high-side driver buffer circuit 17 is connected at an input terminal to the control circuit 15 and at an output terminal to the gate of the second switching transistor M2. When changing the gate signal PHSIDE from low to high, in response to a low output TIMEOUT of the on-time determiner circuit 19, the control circuit 15 and low-side driver buffer circuit 17 turn the gate signal NLSIDE from low to high. This places the second switching transistor M2 in the on-state and establishes continuity between the source and drain.

Meanwhile, when changing the gate signal PHSIDE from low to high, in response to a high output TIMEOUT of the on-time determiner circuit 19, the control circuit 15 and low-side driver buffer circuit 17 maintain the gate signal NLSIDE at low. Accordingly, the second switching transistor M2 remains in the OFF state and a disconnection between the source and drain continues.

Further, the control circuit 15 and low-side driver buffer circuit 17 turn the gate signal NLSIDE from high to low after a certain delay time when a comparator signal IREVDEVET from a reverse current comparator 18 changes from low to high. This places the second switching transistor M2 in OFF state and disconnects between the source and drain.

The reverse current comparator 18 is provided to detect an indication of a reverse flow of the inductor current IL in the inductor L1 and prevent the reverse current from flowing (in opposite direction to the arrow in FIG. 1) therein. It is connected at a non-inverse input terminal (positive) to the switching output LX and at an inverse input terminal (negative) between the second switching transistor M2 and ground level. An offset voltage corresponding to a second current value IL2 is applied to the non-inverse and inverse input terminals of the reverse current comparator 18. Because of this, the reverse current comparator 18 is able to determine whether or not the inductor current IL is decreased to the second current value IL2. The second current value IL2 is set with the certain delay times of the reverse current comparator 18, control circuit 15, and low-side driver buffer circuit 17 taken into account. In other words the second current value IL2 is set to a value so that the second switching transistor M2 is turned off after the certain delay time, for the purpose of preventing a reversal flow of the inductor current IL. The second current value IL2 can be set or changed by changing or setting an amount of the offset voltage at the reverse current comparator 18.

Further, the reverse current comparator 18 is connected at an output terminal to the control circuit 15. It generates a comparator signal IREVDET on the basis of the inputs to the inverse and non-inverse input terminals and outputs it to the control circuit 15. Also, it changes the signal IREVDET from low to high and outputs it to the control circuit 15 after a certain delay time when the inductor current IL is reduced to the second current value IL2. It changes the signal IREVDET from high to low when the first switching transistor M1 is turned off.

The on-time determiner circuit 19 as an operation monitor is configured to monitor the ON time of the first switching transistor M1, that is, a length of time elapsed from the turning-on of the first switching transistor M1. It is connected at an input terminal between the high-side driver buffer circuit 16 and first switching transistor M1 to receive the gate signal PHSIDE from the high-side driver buffer circuit 16. It is connected at an output terminal to the control circuit 15 to generate an output TIMEOUT on the basis of the gate signal PHSIDE and output it to the control circuit 15. A determination time T1 (FIG. 3 and else) is preset in the on-time determiner circuit 19. It starts counting the ON time from the turning of the gate signal PHSIDE from high to low, and changes the output TIMEOUT from low to high when the ON time exceeds the preset determination time T1. It changes the output TIMEOUT from high to low upon a change in the gate signal PHSIDE from low to high. Thus, it monitors the ON time or operation state of the first switching transistor M1 by detecting a change in the gate signal PHSIDE.

According to the switching regulator 10, along with an increase in the output voltage $V_{OUT}$, the voltage of the output ERROUT of the error amplifier 12 decreases and a duty cycle of the output PWMOUT of the PWM comparator 14 lowers. This leads to shortening the ON time of the first switching transistor M1 and elongating the ON time of the second switching transistor M2 to decrease the output voltage $V_{OUT}$ accordingly. Meanwhile, with a decrease in the output voltage $V_{OUT}$ the voltage of the output ERROUT of the error amplifier 12 rises and the duty cycle of the output PWMOUT of the PWM comparator 14 increases. This elongates the ON time of the first switching transistor M1 and shortening the ON time of the second switching transistor M2 to increase the output voltage $V_{OUT}$. Thus, the switching regulator 10 repeats the above operation to control the output voltage $V_{OUT}$ to be constant at a certain voltage.

Owing to the inclusion of the ON time determiner circuit 19, the switching regulator 10 can prevent a reversal flow of the inductor current IL of the inductor L1 through the second switching transistor M2. In the following, problems with the reverse current of the inductor current IL are described for comparison, referring to a switching regulator 1 in FIG. 4 and timing charts in FIGS. 5 and 6.

The switching regulator 1 is an example of the structure for disconnecting the connection between the second switching element and ground level by detecting an indication of occurrence of a reverse current, as in Reference 1. The difference between the switching regulator 1 and that in Reference 1 is in the values of input and output voltages along with a change in delay, and the reversal flow of the inductor current IL occurs similarly.

The structure of the switching regulator 1 is the same as that of the switching regulator 10 according to the first embodiment except for the exclusion of the ON time determiner circuit 19. A detailed description thereof is therefore omitted. In the switching regulator 1 the control circuit 15 and low-side driver buffer circuit 17 change the gate signal NLSIDE from low to high upon a change in the gate signal PHSIDE to the first switching transistor M1 from low to high. This turns on the second switching transistor M2 and establishes continuity between the source and drain. Except for this, the switching regulator 1 operates as the switching regulator 10.

Figure 4:
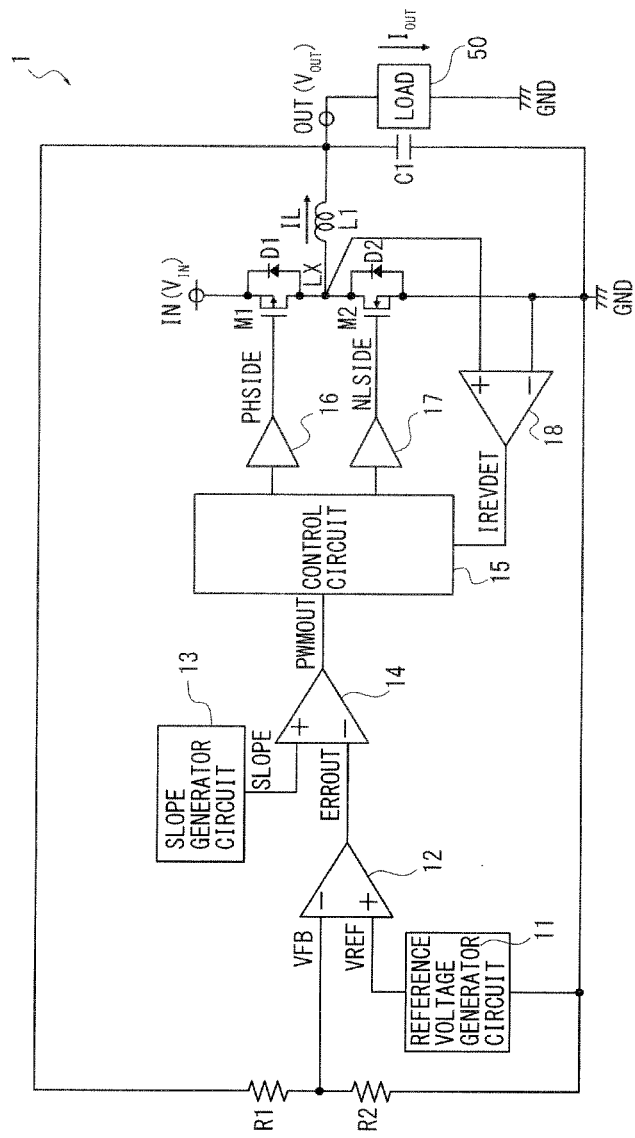
FIG. 4 shows the structure of a switching regulator 1 by way of comparison.
Figure 5:
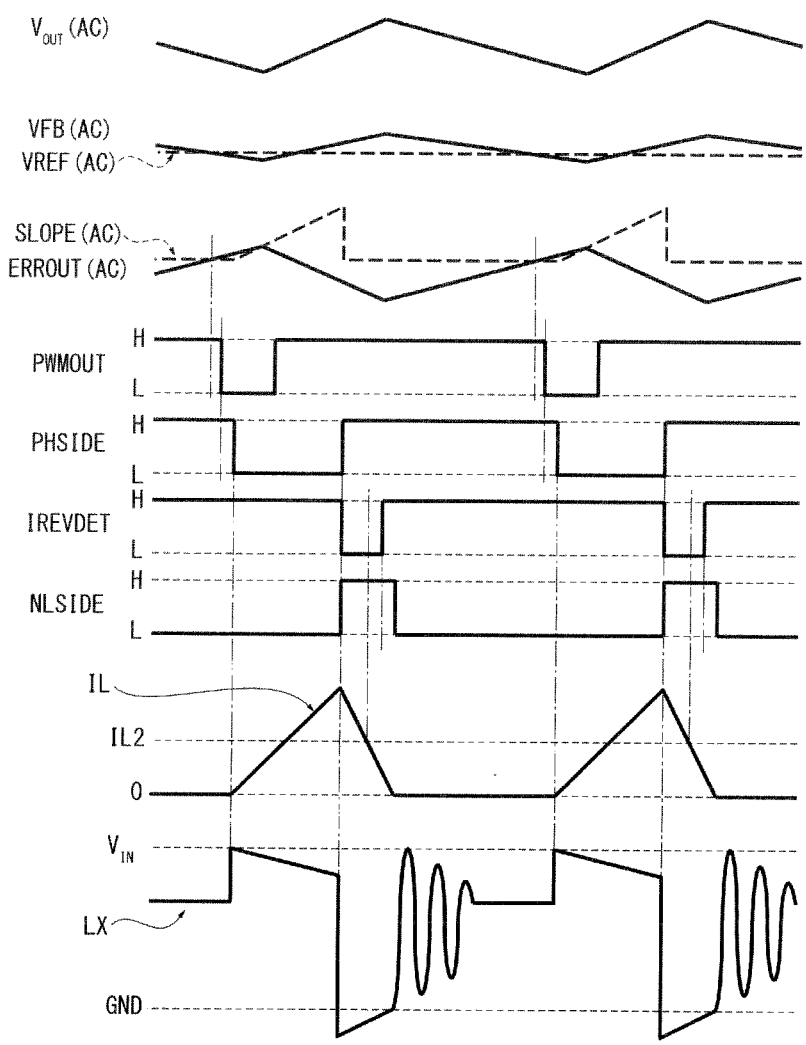
FIG. 5 is a timing chart showing a variation (waveform) in the signals of the switching regulator 1 when a difference between input voltage $V_{IN}$ and output voltage $V_{OUT}$ is not small.

The operation of the switching regulator 1 in FIG. 4 is described referring to FIG. 5. FIG. 5 is a timing chart showing variations in the signals when a difference between the input voltage $V_{IN}$ and output voltage $V_{OUT}$ is not small.

The output voltage $V_{OUT}$ is lowered by discharging the charges of the condenser C1 by an output current $I_{OUT}$. Along with a decrease in the output voltage $V_{OUT}$, the feedback voltage VFB (=[R2/(R1+R2)]×$V_{OUT}$) generated by dividing the output voltage also decreases and the output ERROUT of the error amplifier 12 as an amplified difference between the feedback voltage VFB and the reference voltage VREF from the reference voltage generator circuit 11 increases. Then, the PWM comparator 14 turns the output PWMOUT from high to low after a certain delay time when the output ERROUT has reached the slope voltage SLOPE from the SLOPE generator circuit 13.

Upon the change in the output PWMOUT from high to low, the control circuit 15 and high-side driver buffer circuit 16 turns the gate signal PHSIDE to the first switching transistor M1 from high to low after a certain delay time. This turns on the first switching transistor M1 and the switching output LX has an equal potential to that of the input voltage $V_{IN}$. Accordingly, the inductor current IL of the inductor rises from zero at an inclination of ($V_{IN}$–$V_{OUT}$)/L where L is an inductance of the inductor L1.

When the inductor current IL reaches the OFF current threshold, the control circuit 15 and high-side driver buffer circuit 16 control the gate signal PHSIDE to be high from low to turn off the first switching transistor M1. Also, the control circuit 15 and low-side driver buffer circuit 17 controls the gate signal NLSIDE to the second switching transistor M2 to be high from low to turn on the second switching transistor M2. Thus, the switching output LX lowers to about a ground level (GND).

Then, the inductor current IL of the inductor L1 decreases at an inclination of –$V_{OUT}$/L. When the inductor current IL decreases to the second current value IL2, the reverse current comparator 18 turns the signal IREVDET from low to high after a certain delay time and outputs it to the control circuit 15. The control circuit 15 and low-side driver buffer circuit 17 then turn the gate signal NLSIDE from low to high after a certain delay time to turn off the second switching transistor M2. Due to the off-state of the second switching transistor M2, the inductor current IL passes through the parasite diode D2 of the second switching transistor M2 and decreases to zero. Rectified by the parasite diode D2 of the second switching transistor M2 in the OFF state, the inductor current IL remains zero or in so-called discontinuous mode unless either the first or second switching transistor M1, M2 is turned on.

Thus, the switching regulator 1 detects an indication of the reversal flow of the inductor current IL by a decrease of the inductor current IL to the second current value IL2 and turns off the second switching transistor M2. Thereby, in the switching regulator 1 the discontinuous mode of the inductor current IL is feasible, reducing oscillation frequency and realizing the VFM mode.

Figure 6:
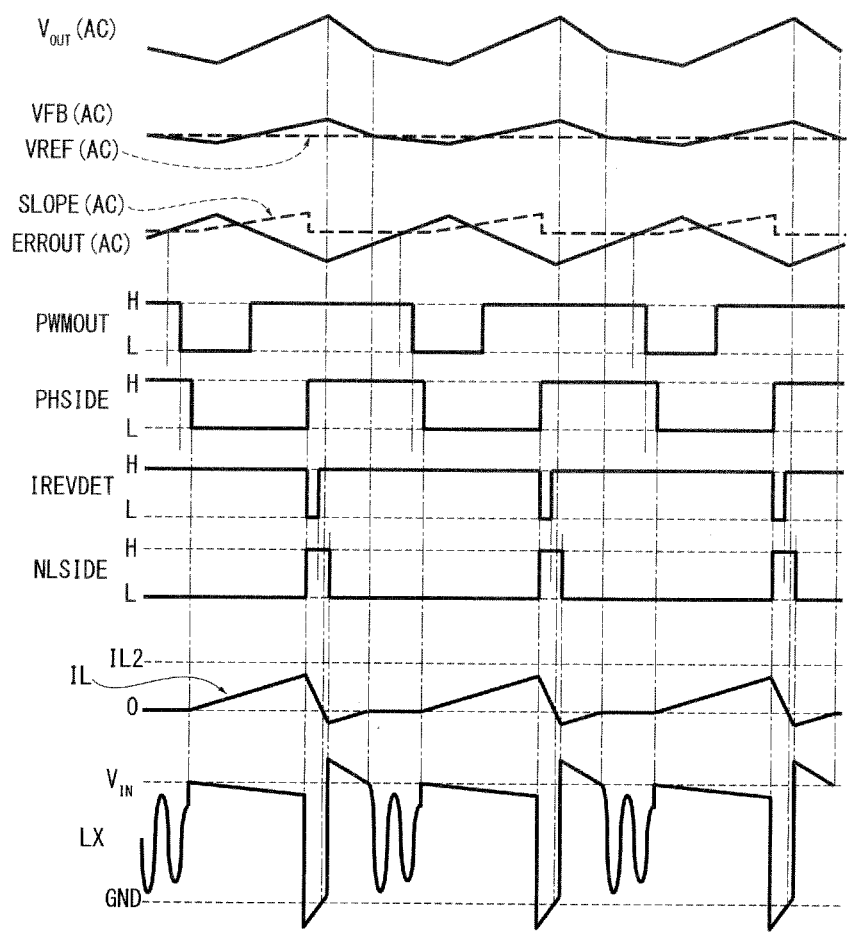
FIG. 6 is a timing chart showing a variation (waveform) in the signals of the switching regulator 1 when a difference between input voltage $V_{IN}$ and output voltage $V_{OUT}$ is small.

Next, the operation of the switching regulator 1 in FIG. 4 is described referring to FIG. 6. The timing chart in FIG. 6 is a timing chart showing variations in the signals when a difference between the input voltage vi, and output voltage $V_{OUT}$ is small. The switching regulator 1 operates as in FIG. 5 until the gate signal PHSIDE turns from low to high. The gate signal PHSIDE is turned from low to high when the time from the turning-on of the first switching transistor M1 has reached the OFF time threshold.

The first switching transistor M1 is turned off by the gate signal PHSIDE's turning from low to high. The control circuit 15 and low-side driver buffer circuit 17 change the gate signal NLSIDE from low to high to turn on the second switching transistor M2. This decreases the switching output LX to about the ground level GND and decreases the inductor current IL of the inductor L1 at an inclination of –$V_{OUT}$/L.

In FIG. 6 at the turning-on of the second switching transistor M2, however, the inductor current IL is already below the second current value IL2. This is because the turning-on of the first switching transistor M1 increases the inductor current IL from zero at an inclination of ($V_{IN}$–$V_{OUT}$)/L but the increase is not sufficient due to a small difference between the input voltage $V_{IN}$ and output voltage $V_{OUT}$. The reverse current comparator 18 detects an indication of reverse current since the inductor current IL is below the second current value IL2, turns the signal IREVDET from low to high after a certain delay time and outputs it to the control circuit 15. Then, the control circuit 15 and low-side driver buffer circuit 17 turn the gate signal NLSIDE from high to low after a certain delay time to turn off the second switching transistor M2.

However, the inductor current IL takes a negative value and reversely flows when the second switching transistor M2 is turned off. This is because the second current value IL2 is defined with two kinds of the delay time of the reverse current comparator 18, and the control circuit 15 and low-side driver buffer circuit 17 taken into account. Thus, when the reverse current comparator 18 detects an indication of the reversal flow of the inductor current IL, the inductor current IL has been already reversed. Thus, the switching regulator 1 cannot place the second switching transistor M2 in the OFF state before the reversal flow of the inductor current if the inductor current IL is below the second current value IL2.

After the second switching transistor M2 is turned off, the inductor current IL passes through the parasite diode D1 of the first switching transistor M1 and decreases to zero. Since the inductor current IL is rectified by the parasite diode D1, it remains zero unless the first switching transistor M2 is turned on.

As described above, while the inductor current IL is reversely flowed (zero or less), the output voltage $V_{OUT}$ decreases at a higher speed than when the inductor current IL is zero so that the time taken for the first switching transistor M1 to turn on is shortened from that when the inductor current IL is zero. This is due to the fact that the first switching transistor M1 is turned on depending on the difference between the feedback voltage VFB and reference voltage VREF in line with the output voltage $V_{OUT}$. The reversal flow of the inductor current IL hinders a desired decrease in the switching frequency.

Accordingly, in the switching regulator 1 the inductor current IL may reversely flow depending on the condition of input or output voltage. Further, the switching regulator 1 is not able to decrease the switching frequency to a desired value and in the worst case the switching regulator 1 cannot operate in the VFM mode, deteriorating efficiency during a light load.

Figure 2:
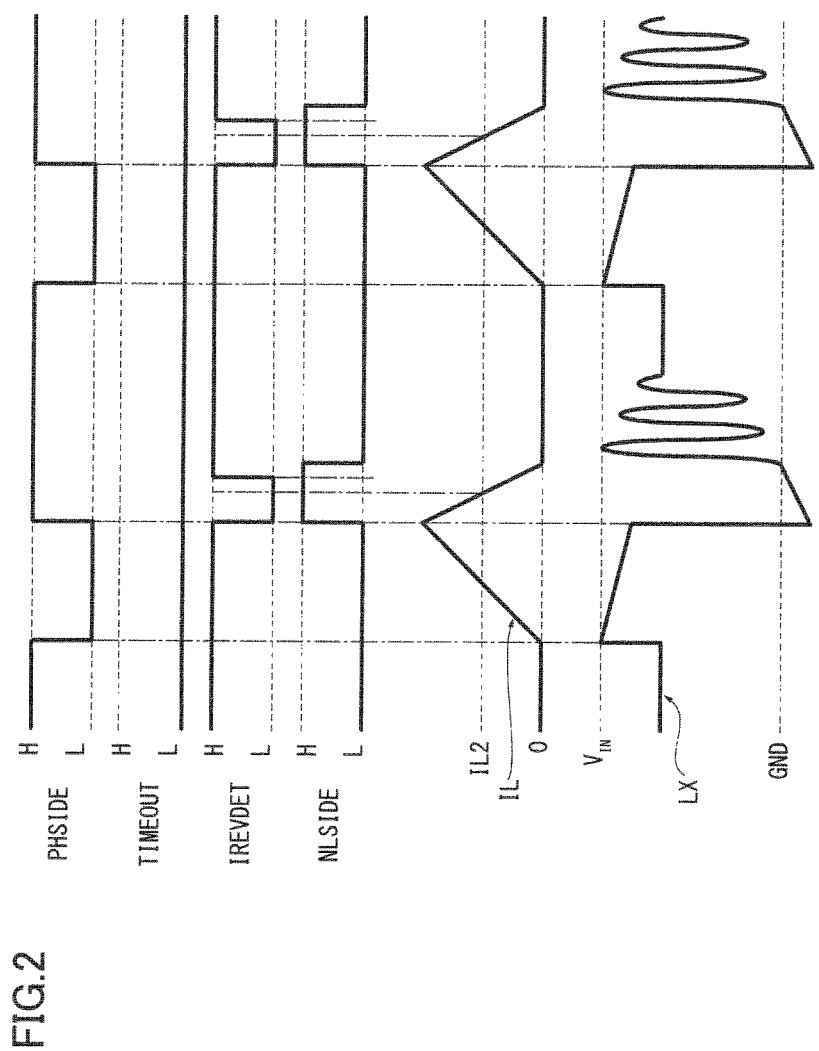
FIG. 2 is a timing chart showing a variation (waveform) in the signals of the switching regulator 10 when a difference between input voltage $V_{IN}$ and output voltage $V_{OUT}$ is not small.
Figure 3:
FIG. 3 is a timing chart showing a variation (waveform) in the signals of the switching regulator 10 when a difference between input voltage $V_{IN}$ and output voltage $V_{OUT}$ is small.

Meanwhile, the switching regulator 10 includes the on-time determiner circuit 19 as an operation monitor so as to be able to prevent the inductor current IL from reversely flowing. The operation of the switching regulator 10 in FIG. 1 is described referring to FIGS. 2 and 3. In FIGS. 2 and 3 the changes in the signals at upstream of the control circuit 15 are the same as those in the switching regulator 1, therefore, they are omitted for the sake of better understanding. The timing chart in FIG. 2 shows a variation in each signal when a difference between the input voltage $V_{IN}$ to the input terminal IN and the output voltage $V_{OUT}$ from the output terminal OUT is not small.

The first switching transistor M1 turns on by the gate signal PHSIDE's turning from high to low. Because of this, the potential of the switching output LX becomes equal to that of the input voltage $V_{IN}$, increasing the inductor current IL to the inductor L1 from zero at an inclination of $(V_{IN}-V_{OUT})/L$.

The on-time determiner circuit 19 starts counting the ON time of the first switching transistor M1 from when the gate signal PHSIDE has changed from high to low. It changes the output TIMEOUT from low to high when the ON time exceeds the determination time T1 (FIG. 3). In FIG. 2 the on-time determiner circuit 19 maintains the output TIMEOUT low since the first switching transistor M1 is turned off before the ON time of the first switching transistor M1 reaches the determination time T1.

Then, when the inductor current IL reaches the OFF current threshold, the control circuit 15 and the high-side driver buffer circuit 16 turn the gate signal PHSIDE from low to high, placing the first switching transistor M1 in the OFF state. Also, in response to the output TIMEOUT being low, the control circuit 15 and low-side driver buffer circuit 17 turn the gate signal NLSIDE from low to high, placing the second switching transistor M2 in the ON state to decrease the switching output LX to about the ground level GND.

Then, the inductor current IL into the inductor L1 decreases at an inclination of $-V_{OUT}/L$. When the inductor current IL decreases to the second current value IL2, the reverse current comparator 18 turns the comparator signal IREVDET from low to high after a certain delay time. The control circuit 15 and low-side driver buffer circuit 17 turn the gate signal NLSIDE from high to low to turn off the second switching transistor M2. The inductor current IL continues to decrease to zero through the parasite diode D2 of the second switching transistor M2 in the OFF state. Rectified by the parasite diode D2, the inductor current IL remains zero, that is, in discontinuous mode until either the first or second switching transistor M1, M2 is turned on.

Thus, the switching regulator 10 detects the indication of a reversal flow of the inductor current IL by a decrease in the inductor current IL to the second current value IL2 and then turns off the second switching transistor M2. Accordingly, the discontinuous mode of the inductor current IL is feasible, reducing oscillation frequency and realizing the VFM mode.

Next, the operation of the switching regulator 10 in FIG. 1 is described referring to FIG. 3. The timing chart in FIG. 3 shows a variation in each signal when a difference between the input voltage $V_{IN}$ to the input terminal IN and the output voltage $V_{OUT}$ from the output terminal OUT is small.

The first switching transistor M1 turns on by the gate signal PHSIDE's turning from high to low. Because of this, the potential of the switching output LX becomes equal to that of the input voltage $V_{IN}$, increasing the inductor current IL to the inductor L1 from zero at an inclination of $(V_{IN}-V_{OUT})/L$.

The on-time determiner circuit 19 starts counting the ON time of the first switching transistor M1 from when the gate signal PHSIDE has changed from high to low. It changes the output TIMEOUT from low to high when the ON time exceeds the determination time T1.

Then, when the ON time of the first switching transistor M1 reaches the OFF time threshold, the control circuit 15 and the high-side driver buffer circuit 16 turn the gate signal PHSIDE from low to high, placing the first switching transistor M1 in the OFF state. The OFF time threshold is set to be longer than the determination time T1 so that it does not affect a determination on whether the ON time is longer than the determination time T1 and the output TIMEOUT is turned to high as described above. In response to the output TIMEOUT being high, the control circuit 15 and low-side driver buffer circuit 17 maintain the gate signal NLSIDE low. As a result, the second switching remains OFF.

Accordingly, when the first switching transistor M1 is turned off, the inductor current IL flows through the parasite diode D2 of the second switching transistor M2 in the OFF state. Rectified by the parasite diode D2, the inductor current IL remains zero, that is, in discontinuous mode, until the first switching transistor M1 is turned on.

Thus, in the switching regulator 10 the second switching transistor M2 remains in the OFF state while the first switching transistor M1 continues to be ON for a longer time than the determination time T1. Thereby, a reversal flow of the inductor current IL through the second switching transistor M2 can be surely prevented. Further, a desired discontinuous mode of the inductor current IL is feasible, reducing oscillation frequency and realizing the VFM mode.

According to the switching regulator 10, it is able to reliably prevent a reversal flow of the inductor current IL even when the difference between the input voltage $V_{IN}$ to the input terminal IN and the output voltage $V_{OUT}$ from the output terminal OUT is small. According to the present embodiment the inductor current IL rises from zero at an inclination of $(V_{IN}-V_{OUT})/L$ since the turning-on of the first switching transistor M1. That is, the inductor current IL rises more gradually when the difference between input voltage $V_{IN}$ and the output voltage $V_{OUT}$ is small than when the difference is large, and it requires a larger amount of time to reach the OFF current threshold. In view of this, in the switching regulator 10 the second switching transistor M2 remains OFF or the switching operation of the second switching transistor M2 is not conducted when the ON time of the first switching transistor M1 is longer than the determination time T1. Thereby, the second switching transistor M2 is prevented from turning on while the inductor current IL does not reach the second current value IL2. Since the second switching transistor M2 remains OFF even when the first switching transistor M1 is turned off at a small difference between the input voltage $V_{IN}$ and the output voltage $V_{OUT}$. Thus, a reversal flow of the inductor current IL can be reliably prevented.

Owing to the secure prevention of a reversal of the inductor current IL, the switching regulator 10 can decrease oscillation frequency as desired and realize the VFM mode. Further, it can improve efficiency during a small load.

Furthermore, according to the switching regulator 10 the second switching transistor M2 is turned on when the first switching transistor M1 is turned off, if the ON time of the first switching transistor M1 is shorter than the determination time T1. This means that the inductor current IL has reached the OFF current threshold. Therefore, at the turning-on of the second switching transistor M2, the inductor current IL can be larger than the second current value IL2. Thereby, a reversal flow of the inductor current IL can be prevented even when the second switching transistor M2 is turned off by the reverse current comparator 18. Accordingly, the inductor current IL can flow through the second switching transistor M2 in the ON state and a reversal thereof through the second switching transistor M2 can be prevented, which can improve the overall efficiency. This is because a loss of a rectified inductor current IL by a resistance during the ON state of the second switching transistor M2 is smaller than that by the parasite diode D2.

The switching regulator 10 can be a simple structure including the on-time determiner circuit 19 provided to connect a point between the high-side driver buffer circuit 16 and first switching transistor M1 and the control circuit 15, contributing to cost reduction.

Further, the gate signal NLSIDE generated by the control circuit 15 and low-side driver buffer circuit 17 is changed in accordance with the output (output TIMEOUT in the present embodiment) of the on-time determiner circuit 19 as an operation monitor. This can switch the ON and OFF of the second switching transistor M2. That is, the switching regulator 10 changes the switching of the second switching transistor M2 on the basis of a monitoring result from the on-time determiner circuit 19. Thus, the switching regulator 10 can be a simple structure additionally including the on-time determiner circuit 19 with the setting of the control circuit 15 changed, which enables cost reduction.

According to the switching regulator 10, it has only to set the determination time T1 of the on-time determiner circuit 19 in advance so that a reversal flow of the inductor current IL can be securely prevented while various set values of the other elements can be freely dealt with. This can greatly contribute to increasing the degree of freedom in which the switching regulator 10 is designed and facilitating the design of the switching regulator 10.

As described above, the switching regulator 10 according to the first embodiment can prevent the occurrence of a reverse current in the inductor L1 irrespective of the condition of the input voltage $V_{IN}$ and output voltage $V_{OUT}$ and improve the efficiency during a small load.

Second Embodiment

Figure 7:
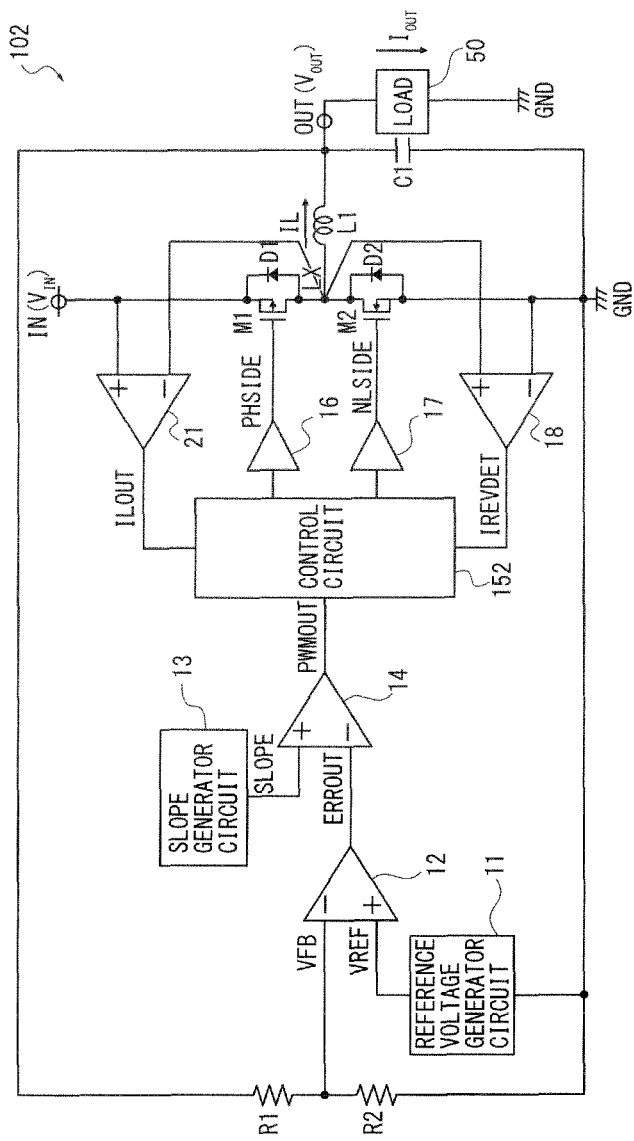
FIG. 7 shows the structure of a switching regulator 102 according to a second embodiment.
Figure 8:
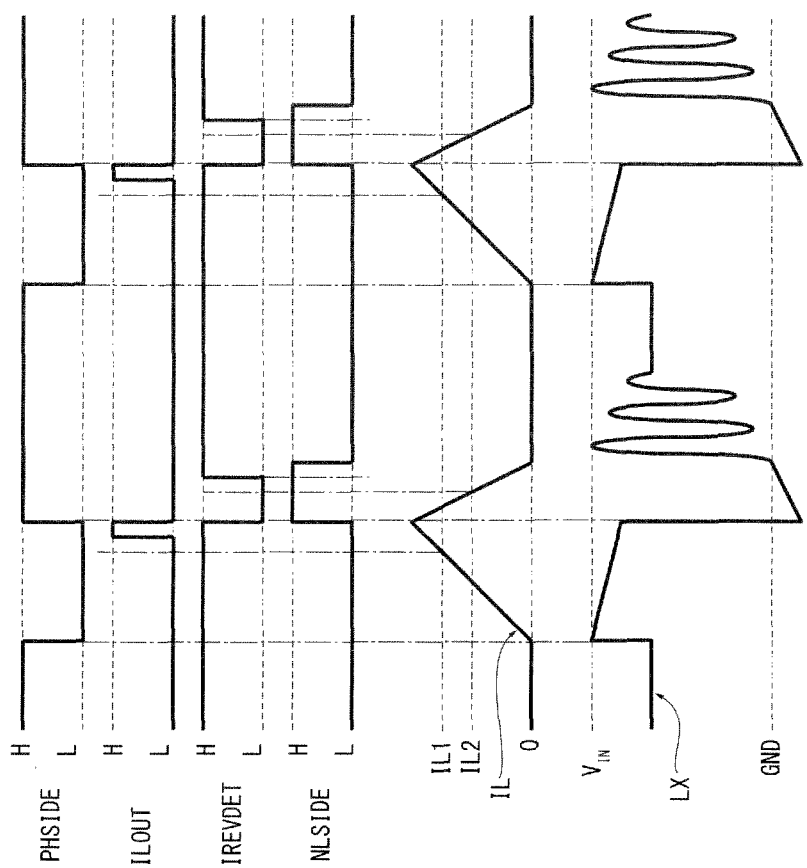
FIG. 8 is a timing chart showing a variation (waveform) in the signals of the switching regulator 102 when a difference between input voltage $V_{IN}$ and output voltage $V_{OUT}$ is not small.
Figure 9:
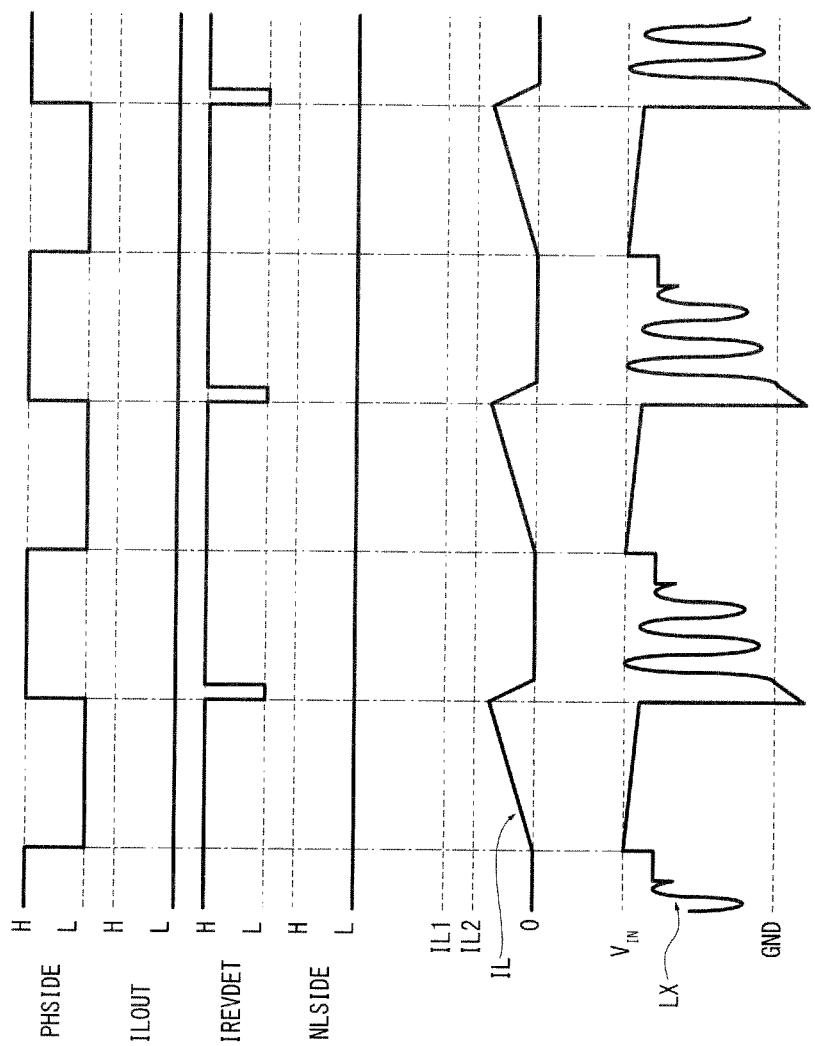
FIG. 9 is a timing chart showing a variation (waveform) in the signals of the switching regulator 102 when a difference between input voltage $V_{IN}$ and output voltage $V_{OUT}$ is small.

Next, a switching regulator 102 according to a second embodiment is described referring to FIGS. 7 to 9. The switching regulator 102 comprises an inductor current comparator 21 instead of the on-time determiner circuit 19 of the switching regulator 10 according to the first embodiment and its basic structure is the same as that of the switching regulator 10. Therefore, a detailed description thereof is omitted. FIG. 7 shows the structure of the switching regulator 102. FIG. 8 is a timing chart showing a variation (waveform) in the signals of the switching regulator 102 when a difference between input voltage $V_{IN}$ and output voltage $V_{OUT}$ is not small. FIG. 9 is a timing chart showing a variation (waveform) in the signals of the switching regulator 102 when a difference between input voltage $V_{IN}$ and output voltage $V_{OUT}$ is small.

The switching regulator 102 comprises the inductor current comparator 21 as an operation monitor in place of the on-time determiner circuit 19. The inductor current comparator 21 is configured to monitor the inductor current IL flowing into the inductor L1 while the first switching transistor M1 is ON, and generate a determination signal ILOUT in accordance with the inductor current IL. That is, it monitors the operation state of the first switching transistor M1 according to the inductor current IL to generate a determination signal ILOUT according to a monitoring result. The inductor current comparator 21 is connected at an output terminal to a control circuit 152 and output the determination signal ILOUT thereto.

The non-inverse input terminal (positive terminal) of the inductor current comparator 21 is connected between the input terminal IN and the first switching transistor M1 while the inverse input terminal (negative terminal) thereof is connected to the switching output LX. The non-inverse input terminal and inverse input terminal are applied with an offset voltage (FIG. 8) corresponding to a first current value IL1. Because of this, the current comparator 21 can determine whether or not the inductor current IL has reached the first current value IL1. Thus, the inductor current comparator 21 functions as an inductor current determiner circuit.

The first current value IL1 is set with a certain delay time of the inductor current comparator 21 taken into account. Specifically, the inductor current comparator 21 turns the determination signal ILOUT from low to high in a certain delay time after the inductor current IL has reached the first current value IL1. The control circuit 15 and low-side driver buffer circuit 17 turn the gate signal NLSIDE from low to high in response to the high determination signal ILOUT to turn on the second switching transistor M2. The reversal flow of the inductor current IL is preventable as long as the inductor current IL exceeds the second current value IL2 at the turning-on of the second switching transistor M2, in other words, even when the second switching transistor M2 is turned off by the reverse current comparator 18. In view of this, the first current value IL1 is set so that the inductor current IL becomes larger than the second current value IL2 at the turning-on of the second switching transistor M2 with the certain delay time taken into account. According to the second embodiment, the first current value IL1 is larger than the second current value IL2 (FIG. 8), however, it can be arbitrarily set or changed by changing an offset voltage of the inductor current comparator 21.

With the inductor current comparator 21 in place of the on-time determiner circuit 19, the operation of the control circuit 152 is different from that of the control circuit 15 of the first embodiment. The control circuit 152 receives the determination signal ILOUT from the inductor current comparator 21 instead of the output TIMEOUT from the on-time determiner circuit 19 and it differently generates the gate signal NLSIDE together with the low-side driver buffer circuit 17. In addition, the control circuit 152 uses the OFF time threshold alone for deciding the turning of the gate signal PHSIDE from low to high.

Specifically, the control circuit 152 and high-side driver buffer circuit 16 turn the gate signal PHSIDE from low to high when the ON time of the first switching transistor M1 reaches the OFF time threshold. Now, the first switching transistor M1 is turned off and the continuity between the source and drain is disconnected. In the second embodiment using a step-down DC-DC converter, the OFF time threshold is obtained by multiplying the ON time during the PWM mode by a proportionality coefficient A, that is, [(output voltage $V_{OUT}$/input voltage $V_{IN}$)/fs]×A where fs is switching frequency. The OFF time threshold is not always a constant value and varies depending on a condition.

Further, an turning the gate signal PHSIDE from low to high, the control circuit 152 and low-side driver buffer circuit 17 turn the gate signal NLSIDE from low to high when the determination signal ILOUT of the inductor current comparator 21 is high. Thereby, the second switching transistor M2 is turned on and continuity between the source and drain becomes established.

When the determination signal ILOUT of the inductor current comparator 21 is low, the control circuit 152 and low-side driver buffer circuit 17 maintain the gate signal NLSIDE low. The second switching transistor M2 remains OFF and continuity between the source and drain remains disconnected.

Next, the operation of the switching regulator 102 in the second embodiment is described referring to the timing charts in FIGS. 8, 9. For better understanding FIGS. 8 and 9 omit showing a variation in each signal at upstream of the control circuit 152.

By turning the gate signal PHSIDE from high to low, the first switching transistor M1 is turned on. Because of this, the potential of the switching output LX becomes equal to that of the input voltage $V_{IN}$. Accordingly, the inductor current IL of the inductor rises from zero at an inclination of $(V_{IN}-V_{OUT})/L$.

While the first switching transistor M1 is ON, the inductor current comparator 21 monitors whether the inductor current IL to the inductor L1 has reached the first current value IL1. It maintains the determination signal ILOUT low while the inductor current IL does not reach the first current value IL1 and it turns the determination signal ILOUT from low to high when the inductor current IL reaches the first current value IL1. In FIG. 8 the inductor current comparator 21 turns the determination signal ILOUT from low to high in a certain delay time after the inductor current IL reaches the value IL1.

When the ON time of the first switching transistor M1 matches the OFF time threshold, the control circuit 152 and high-side driver buffer circuit 16 turn the gate signal PHSIDE from low to high to turn off the first switching transistor M1. Further, in response to the high determination signal ILOUT from the inductor current comparator 21, the control circuit 152 and low-side driver buffer circuit 17 turn the gate signal NLSIDE from low to high to turn on the second switching transistor M2 and decrease the switching output LX to about the ground level GND.

Then, the inductor current IL decreases at an inclination of $-V_{OUT}/L$. At the inductor current IL being the second current value IL2, the reverse current comparator 18 turns the comparator signal IREVDET from low to high after a certain delay time and outputs it to the control circuit 152. The control circuit 152 and low-side driver buffer circuit 17 turn the gate signal NLSIDE from high to low after a certain delay time to turn off the second switching transistor M2. Then, the inductor current IL passes through the parasite diode D2 of the second switching transistor M2 in the OFF state and decreases to zero. Rectified by the parasite diode D2, it remains zero or in discontinuous mode unless either the first or second switching transistor M1, M2 is turned on.

Thus, the switching regulator 102 detects an indication of the reversal flow of the inductor current IL by a decrease of the inductor current IL to the second current value IL2 and turns off the second switching transistor M2. Thereby, in the switching regulator 102 the discontinuous mode of the inductor current IL is feasible, reducing oscillation frequency and realizing the VFM mode.

Next, the operation of the switching regulator 102 in FIG. 7 is described referring to FIG. 9.

By turning the gate signal PHSIDE from high to low, the first switching transistor M1 is turned on. Because of this, the switching output LX has an equal potential to that of the input voltage $V_{IN}$. Accordingly, the inductor current IL of the inductor rises from zero at an inclination of $(V_{IN}-V_{OUT})/L$.

While the first switching transistor M1 is ON, the inductor current comparator 21 monitors whether the inductor current IL to the inductor L1 has reached the first current value IL1. It maintains the determination signal ILOUT low while the inductor current IL does not reach the first current value IL1 and it turns the determination signal ILOUT from low to high when the inductor current IL reaches the first current value IL1. In FIG. 9 since the inductor current IL has not reached the value IL1, the inductor current comparator 21 maintains the determination signal ILOUT low.

When the ON time of the first switching transistor M1 has reached the OFF time threshold, the control circuit 152 and high-side driver buffer circuit 16 turn the gate signal PHSIDE from low to high to turn off the first switching transistor M1. Further, in response to the low determination signal ILOUT from the inductor current comparator 21, the control circuit 152 and low-side driver buffer circuit 17 maintain the gate signal NLSIDE low so that the second switching transistor M2 remains OFF.

When the first and second switching transistors M1, M2 are both turned off, the inductor current IL flows through the parasite diode D2 of the second switching transistor M2. Rectified by the parasite diode D2, the inductor current IL remains zero, that is, in discontinuous mode unless the first switching transistor M1 is turned on.

Thus, in the switching regulator 102 the second switching transistor M2 is configured to remain OFF unless the inductor current IL reaches the first current value IL1. This can surely prevent a reversal flow of the inductor current IL through the second switching transistor M2 and enables a desired discontinuous mode of the inductor current IL. As a result, the oscillation frequency can be lowered to a desired value, realizing the VFM mode.

According to the switching regulator 102, it is able to reliably prevent a reversal flow of the inductor current IL even when the difference between the input voltage $V_{IN}$ to the input terminal IN and the output voltage $V_{OUT}$ from the output terminal OUT is small. According to the present embodiment, at the timing when the first switching transistor M1 is turned on, the inductor current comparator 21 determines whether or not the inductor current IL has reached the first current value IL1. The first current value IL1 is set so that the inductor current IL exceeds the second current value IL2 when the second switching transistor M2 is turned on, with the delay time of the inductor current comparator 21 taken into consideration. Therefore, if the inductor current IL does not reach the first current value IL1, the inductor current IL is smaller than the second current value IL2 at the turning-on of the second switching transistor M2. In view of this, the second switching transistor M2 remains OFF, that is, the switching operation over the second switching transistor M2 is not conducted when the inductor current IL does not reach the first current value IL1. Thereby, the second switching transistor M2 is prevented from turning on while the inductor current IL does not reach the second current value IL2 since the second switching transistor M2 remains off even when the first switching transistor M1 is turned off with a small difference between the input voltage $V_{IN}$ and the output voltage $V_{OUT}$. Thus, a reversal flow of the inductor current IL can be reliably prevented.

Owing to the secure prevention of a reversal of the inductor current IL, the switching regulator 102 can decrease oscillation frequency as desired and realize the VFM mode. Further, it can improve efficiency during a small load.

Furthermore, according to the switching regulator 102 the second switching transistor M2 is turned on when the first switching transistor M1 is turned off, if the inductor current IL has reached the first current value IL1. The first current value IL1 is set so that the inductor current IL exceeds the second current value IL2 when the second switching transistor M2 is turned on, with the delay time of the inductor current comparator 21 taken into consideration. Thus, at the turning-on of the second switching transistor M2, the inductor current IL can be larger than the second current value IL2. Thereby, a reversal flow of the inductor current IL can be prevented even when the second switching transistor M2 is turned off by the reverse current comparator 18. Accordingly, the inductor current IL can flow through the second switching transistor M2 in the ON state and a reversal flow thereof through the second switching transistor M2 can be prevented, which can improve the overall efficiency. This is because a loss of a rectified inductor current IL by a resistance during the on-state of the second switching transistor M2 is smaller than that by the parasite diode D2.

The switching regulator 102 can be a simple structure including the inductor current comparator 21 provided to connect a point between the input terminal IN and first switching transistor M1, switching output LX and control circuit 152, contributing to cost reduction.

Further, the gate signal NLSIDE generated by the control circuit 152 and low-side driver buffer circuit 17 is changed in accordance with the output (signal ILOUT in the present embodiment) of the inductor current comparator 21 as an operation monitor. This can switch the turning-on and turning-off of the second switching transistor M2. That is, the switching regulator 102 changes the switching of the second switching transistor M2 on the basis of a monitoring result from the inductor current comparator 21. Thus, the switching regulator 10 can be a simple structure additionally including the inductor current comparator 21 with the setting of the control circuit 152 changed, which enables cost reduction.

According to the switching regulator 102, it has only to set the first current value IL1 of the inductor current comparator 21 in advance so that a reversal flow of the inductor current IL can be securely prevented while various set values of the other elements can be freely dealt with. This can greatly contribute to increasing the degree of freedom in which the switching regulator 102 is designed and facilitating the design of the switching regulator 102.

As described above, the switching regulator 102 according to the second embodiment can prevent the occurrence of a reverse current in the inductor L1 irrespective of the condition of the input voltage $V_{IN}$ and output voltage $V_{OUT}$ and improve the efficiency during a small load.

Third Embodiment

Figure 10:
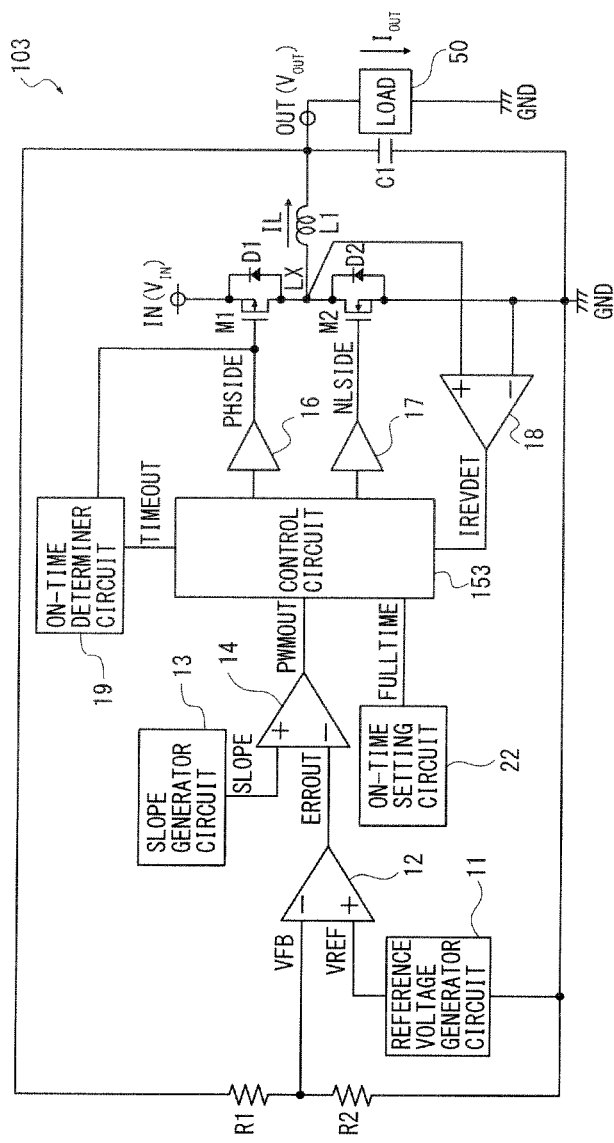
FIG. 10 shows the structure of a switching regulator 103 according to a third embodiment.
Figure 11:
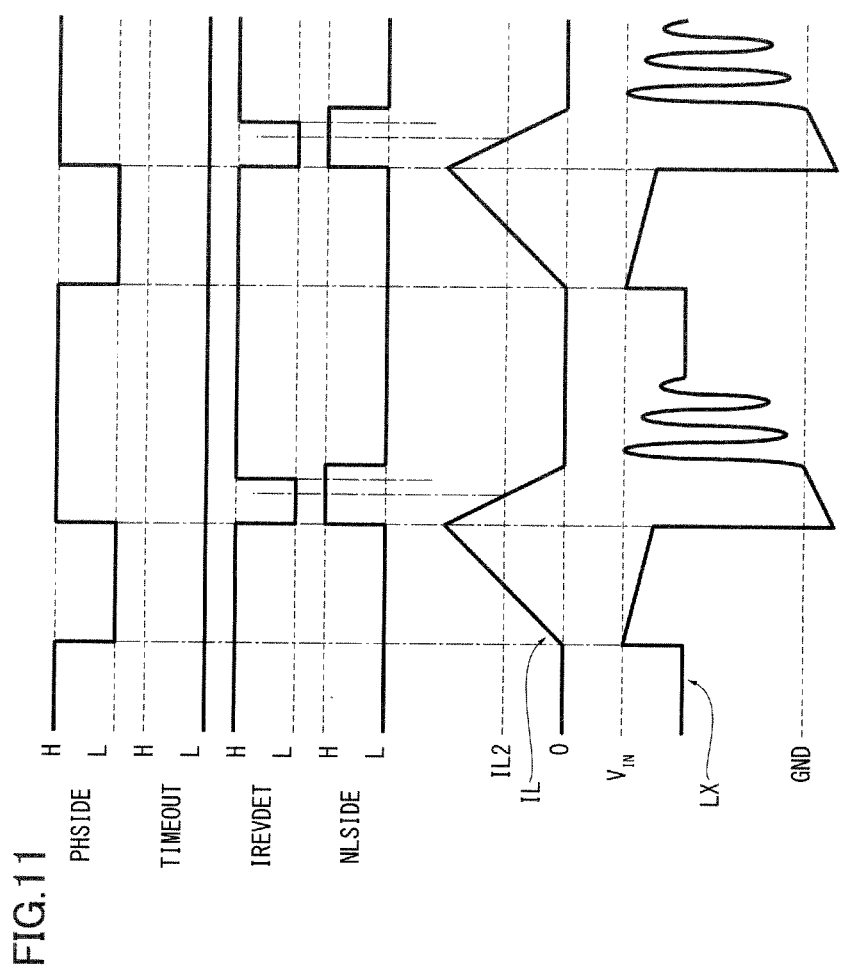
FIG. 11 is a timing chart showing a variation (waveform) in the signals of the switching regulator 103 when a difference between input voltage $V_{IN}$ and output voltage $V_{OUT}$ is not small.
Figure 12:
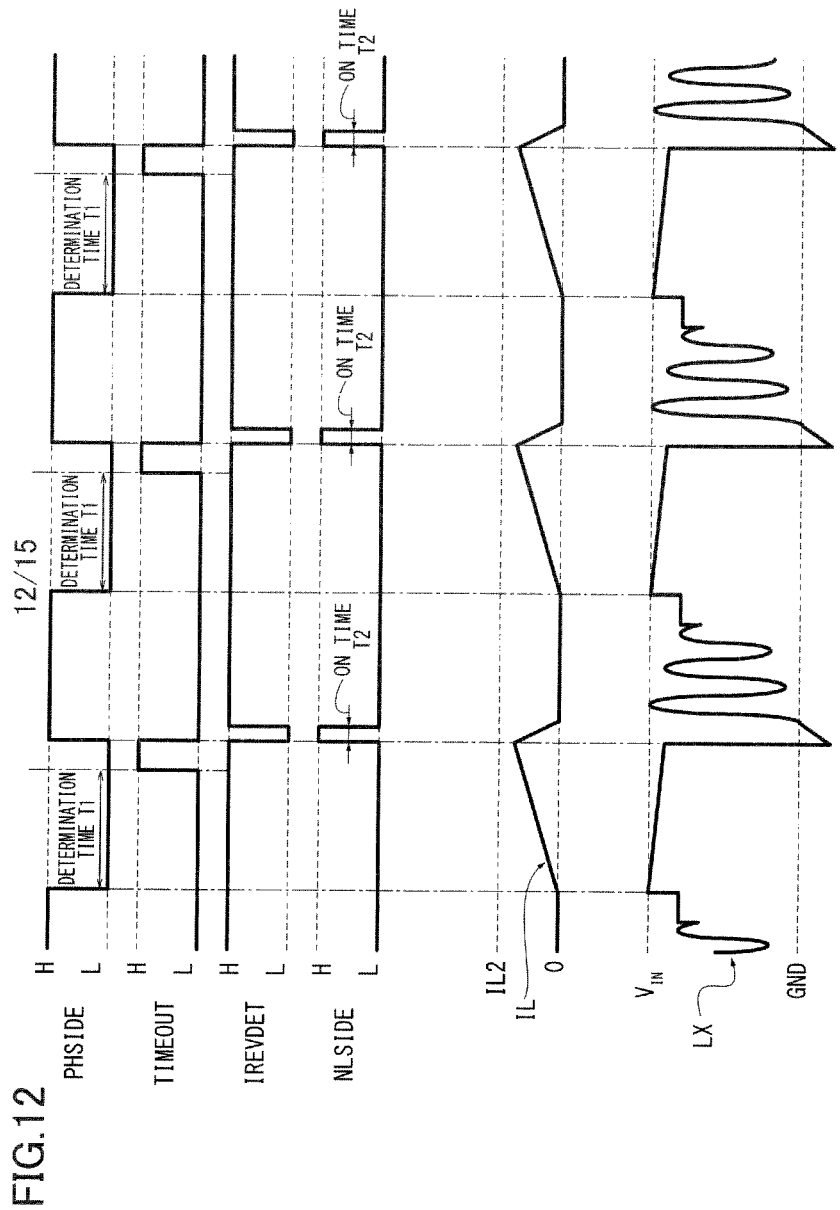
FIG. 12 is a timing chart showing a variation (waveform) in the signals of the switching regulator 103 when a difference between input voltage $V_{IN}$ and output voltage $V_{OUT}$ is small.

Next, a switching regulator 10 according to a third embodiment is described referring to FIGS. 10 to 12. The switching regulator 103 is different from the switching regulator 10 in the first embodiment in that it additionally comprises an on-time setting circuit 22 and its basic structure is the same as that of the switching regulator 10. FIG. 10 shows the structure of the switching regulator 103. FIG. 11 is a timing chart showing a variation (waveform) in the signals of the switching regulator 103 when a difference between input voltage $V_{IN}$ and output voltage $V_{OUT}$ is not small. FIG. 12 is a timing chart showing a variation (waveform) in the signals of the switching regulator 103 when a difference between input voltage $V_{IN}$ and output voltage $V_{OUT}$ is small.

The switching regulator 103 additionally includes the on-time setting circuit 22 to set an ON time T2 for which the ON state of the second switching transistor M2 is maintained. The on-time setting circuit 22 is connected to a control circuit 153, monitors the time from the turning-on of the second switching transistor M2, generates an output FULLTIME indicating that the time has reached the ON time T2 (FIG. 12) and outputs it to the control circuit 153. The setting of the ON time T2 is described later.

The control circuit 153 operates differently from the control circuit 15 in accordance with the operation of the on-time setting circuit 22. It differently generates the gate signal NLSIDE together with the low-side driver buffer circuit 17.

Specifically, when turning the gate signal PHSIDE to the first switching transistor M1 from low to high, the control circuit 153 and low-side driver buffer circuit 17 turn the gate signal NLSIDE from low to high irrespective of the output TIMEOUT from the on-time determiner circuit 19. This turns on the second switching transistor M2 and continuity between the source and drain becomes established.

The control circuit 153 then selects an off-time setter to decide the timing at which the second switching transistor M2 is turned off according to the output TIMEOUT from the on-time determiner circuit 19. According to the third embodiment the reverse current comparator 18 and on-time setting circuit 22 are off-time setters. When changing the gate signal PHSIDE from low to high, the control circuit 153 selects the reverse current comparator 18 in response to a low output TIMEOUT and selects the on-time setting circuit 22 in response to a high output TIMEOUT.

In detail, at the low output TIMEOUT the control circuit 153 generates the gate signal PHSIDE on the basis of the comparator signal IREVDET from the reverse current comparator 18, in turning the gate signal PHSIDE from low to high. In response to the turning of the comparator signal IREVDET from low to high, the control circuit 153 and low-side driver buffer circuit 17 turn the gate signal PHSIDE from low to high after a certain delay time. This turns off the second switching transistor M2 and disconnects the continuity between the source and drain. Thus, the control circuit 153 selects the reverse current comparator 18 as an off-time setter.

At the high output TIMEOUT the control circuit 153 generates the gate signal PHSIDE on the basis of the output FULLTIME from the on-time setting circuit 22, in turning the gate signal PHSIDE from low to high. Upon receiving the output FULLTIME, the control circuit 153 and low-side driver buffer circuit 17 turn the gate signal PHSIDE from low to high. This turns off the second switching transistor M2 and disconnects the continuity between the source and drain. Thus, the control circuit 153 selects the on-time setting circuit 22 as an off-time setter.

The ON time T2 indicated by the output FULLTIME is used when the output TIMEOUT of the on-time determiner circuit 19 is high, that is, the ON state of the first switching transistor M1 continues longer than the determination time T1. That is, it is used to turn off the second switching transistor M2 which has been turned on when the inductor current IL has not reached the second current value IL2. Therefore, the ON time T2 needs to be a length of time taken for the inductor current IL smaller than the second current value IL2 not to become negative or reversed. According to the third embodiment using a step-down DC-DC converter, the ON time T2 is for example obtained by multiplying the ON time during the PWM mode by a proportionality coefficient A, that is, [(output voltage $V_{OUT}$/input voltage $V_{IN}$)/fs]×A where fs is switching frequency, as the OFF time threshold. The maximal ON time T2, for which the first switching transistor M1 continues to be ON without the reversal flow of the inductor current IL, is a value obtained by [[($V_{IN}$–$V_{OUT}$)/$V_{IN}$]/fs]×A. By setting the ON time t2 to be [[($V_{IN}$–$V_{OUT}$)/$V_{IN}$]/fs]×A, it is possible to place the second switching transistor M2 in the ON state for the longest time while preventing the reversal flow of the inductor current IL. The ON time T2 is not always a constant value and varies depending on a condition.

Next, the operation of the switching regulator 103 in the third embodiment is described referring to the timing chart in FIG. 11. For better understanding FIGS. 11 and 12 omit showing a variation in each signal at upstream of the control circuit 153.

By turning the gate signal PHSIDE from high to low, the first switching transistor M1 is turned on. Because of this, the switching output LX has an equal potential to that of the input voltage $V_{IN}$. Accordingly, the Inductor current IL of the inductor L1 rises from zero at an inclination of ($V_{IN}$–$V_{OUT}$)/L.

The on-time determiner circuit 19 starts counting the ON time of the first switching transistor M1 from when the gate signal PHSIDE has changed from high to low. It changes the output TIMEOUT from low to high when the ON time exceeds the determination time T1 (FIG. 12). In FIG. 11 the on-time determiner circuit 19 maintains the output TIMEOUT low since the first switching transistor M1 is turned off before the ON time of the first switching transistor M1 reaches the determination time T1.

When the inductor current IL reaches the OFF current threshold, the control circuit 153 and the high-side driver buffer circuit 16 turn the gate signal PHSIDE from low to high, placing the first switching transistor M1 in the OFF state. Also, the control circuit 153 and low-side driver buffer circuit 17 turn the gate signal NLSIDE from low to high, placing the second switching transistor M2 in the ON state to decrease the switching output LX to about the ground level GND. The control circuit 153 selects the reverse current comparator 18 as an off-time setter since the output TIMEOUT is low, in turning off the first switching transistor M1.

Then, the inductor current IL into the inductor L1 decreases at an inclination of –$V_{OUT}$/L. When the inductor current IL decreases to the second current value IL2, the reverse current comparator 18 turns the comparator signal IREVDET from low to high after a certain delay time. The control circuit 15 and low-side driver buffer circuit 17 turn the gate signal NLSIDE from high to low after a certain delay time to turn off the second switching transistor M2. The inductor current IL continues to decrease to zero, flowing through the parasite diode D2 of the second switching transistor M2 in the OFF state. Rectified by the parasite diode D2, the inductor current IL remains zero, that is, in discontinuous mode unless either the first or second switching transistor M1, M2 is turned on.

Thus, the switching regulator 103 selects the reverse current comparator 18 as an on-time setter to detect an indication of the reversal flow of the inductor current IL by a decrease of the inductor current IL to the second current value IL2 and turn off the second switching transistor M2. Thereby, in the switching regulator 103 the discontinuous mode of the inductor current IL is feasible, reducing oscillation frequency and realizing the VFM mode.

Next, the operation of the switching regulator 103 in FIG. 10 is described referring to the timing chart in FIG. 12.

By turning the gate signal PHSIDE from high to low, the first switching transistor M1 is turned on. Because of this, the switching output LX has an equal potential to that of the input voltage $V_{IN}$. Accordingly, the inductor current IL of the inductor L1 rises from zero at an inclination of ($V_{IN}$–$V_{OUT}$)/L.

The on-time determiner circuit 22 starts counting the ON time of the first switching transistor M1 from when the gate signal PHSIDE has changed from high to low. It changes the output TIMEOUT from low to high when the ON time exceeds the determination time T1.

Then, when the ON time of the first switching transistor M1 reaches the OFF time threshold, the control circuit 153 and the high-side driver buffer circuit 16 turn the gate signal PHSIDE from low to high, placing the first switching transistor M1 in the OFF state. The OFF time threshold is set to be longer than the determination time T1 so that it does not affect a determination on whether the ON time is longer than the determination time T1 and the output TIMEOUT is turned to high as described above. Further, the control circuit 153 and low-side driver buffer circuit 17 turn the gate signal NLSIDE from low to high, turning on the second switching transistor M2 to decrease the switching output LX to about the ground level GND. When turning off the first switching transistor M1, the control circuit 153 selects the ON time setting circuit 22 as an off-time setter since the output TIMEOUT is high.

The on-time determiner circuit 22 starts counting the ON time of the second switching transistor M2 from when the gate signal NLSIDE has changed from low to high. It outputs the output FULLTIME to the control circuit 153 when the count reaches the ON time T2. Upon receiving the output FULLTIME, the control circuit 153 and low-side driver buffer circuit 17 turn the gate signal NLSIDE from high to low. Thereby, the second switching transistor M2 is turned off. Here, due to the ON time T2 set as above, the inductor current IL is not zero. It decreases to zero, passing through the parasite diode D2 of the second switching transistor M2 in the OFF state. Rectified by the parasite diode D2, it remains zero, or in the discontinuous mode unless either the first or second switching transistor M1. M2 is turned on.

Thus, in the switching regulator 103, the on-time setting circuit 22 is selected as an on-time setter to turn off the second switching transistor M2 by the elapse of the ON time T2. This can surely prevent the reversal flow of the inductor current IL, realizing a desired discontinuous mode of the inductor current IL, lowering the oscillation frequency to a desired value and realizing the VFM mode.

According to the switching regulator 103, it is able to reliably prevent a reversal flow of the inductor current IL even when the difference between the input voltage $V_{IN}$ to the input terminal IN and the output voltage $V_{OUT}$ from the output terminal OUT is small. According to the present embodiment the inductor current IL rises from zero at an inclination of ($V_{IN}$–$V_{OUT}$)/L since the turning-on of the first switching transistor M1. That is, the inductor current IL rises more gradually when the difference between input voltage $V_{IN}$ and the output voltage $V_{OUT}$ is small than when the difference is large, and it requires a large amount of time to reach the OFF current threshold. In view of this, in the switching regulator 103, if the ON time of the first switching transistor M1 becomes longer than the determination time T1, the on-time setting circuit 22 is used and the second switching transistor M2 is placed in the ON state for the ON time T2 and then turned off. Thereby, the inductor current IL is prevented from reversing when the inductor current IL does not reach the second current value IL2. The second switching transistor M2 can be turned off before the reversal flow of the inductor current IL even when the first switching transistor M1 is turned off at a small difference between the input voltage $V_{IN}$ and the output voltage $V_{OUT}$. Thus, the reversal flow of the inductor current IL can be reliably prevented.

The ON time T2 is set to be able to place the second switching transistor M2 in the ON state for the longest time while preventing the reversal flow of the inductor current IL. Because of this, even with a small difference between the input voltage $V_{IN}$ and the output voltage $V_{OUT}$, the second switching transistor M2 can be ON as long as possible without the occurrence of the reversal flow of the inductor current IL. Since a loss of a rectified inductor current IL by a resistance during the ON state of the second switching transistor M2 is smaller than that by the parasite diode D2. Thereby, the efficiency of the switching regulator 103 can be improved with a small difference between the input voltage $V_{IN}$ and the output voltage $V_{OUT}$. Thus, the overall efficiency can be enhanced.

Since the inductor current IL can be reliably prevented from reversely flowing, the switching regulator 103 can decrease oscillation frequency as desired and realize the VFM mode. Further, it can improve efficiency during a small load.

Further, when the ON time of the first switching transistor M1 is shorter than the determination time T1, the reverse current comparator 18 is used and the second switching transistor M2 is turned off by a decrease of the inductor current IL to the second current value IL2. Also, this means that the inductor current IL has reached the OFF current threshold. Because of this, at the turning-on of the second switching transistor M2, the inductor current IL can be larger than the second current value IL2. Thus, in the switching regulator 103 the inductor current IL can be prevented from reversing even when the second switching transistor M2 is turned off by the reverse current comparator 18. Also, the inductor current IL can flow through the second switching transistor M2 in the ON state and a reversal thereof through the second switching transistor M2 can be prevented. Thus, the overall efficiency of the switching regulator 103 can be improved because a loss of a rectified inductor current IL by a resistance during the ON state of the second switching transistor M2 is smaller than that by the parasite diode D2.

The switching regulator 103 can be a simple structure including the on-time determiner circuit 22 and the on-time determiner circuit 19 provided to connect a point between the high-side driver buffer circuit 16 and first switching transistor M1 and the control circuit 153, contributing to cost reduction.

Further, the control circuit 153 is configured to select the OFF time setter to turn off the second switching transistor M2 in accordance with the output (TIMEOUT in the present embodiment) of the on-time determiner circuit 19 to change the timing at which the second switching transistor M2 is turned off. That is, the switching regulator 103 changes the switching of the second switching transistor M2 on the basis of a monitoring result from the on-time determiner circuit 19. Thus, the switching regulator 103 can be a simple structure additionally including the on-time determiner circuit 19 and on-time setting circuit 22 with the setting of the control circuit 15 changed, which enables cost reduction.

According to the switching regulator 103, it has only to set the determination time T1 of the on-time determiner circuit 19 and the ON time T2 of the on-time setting circuit 22 in advance so that a reversal flow of the inductor current IL can be securely prevented while various set values of the other elements can be freely dealt with. This can greatly contribute to increasing the degree of freedom in which the switching regulator 10 is designed and facilitating the design of the switching regulator 103.

Thus, the switching regulator 103 according to the third embodiment can prevent the occurrence of a reverse current in the inductor L1 irrespective of the condition of the input voltage $V_{IN}$ and output voltage $V_{OUT}$ and improve the efficiency during a small load.

Fourth Embodiment

Figure 13:
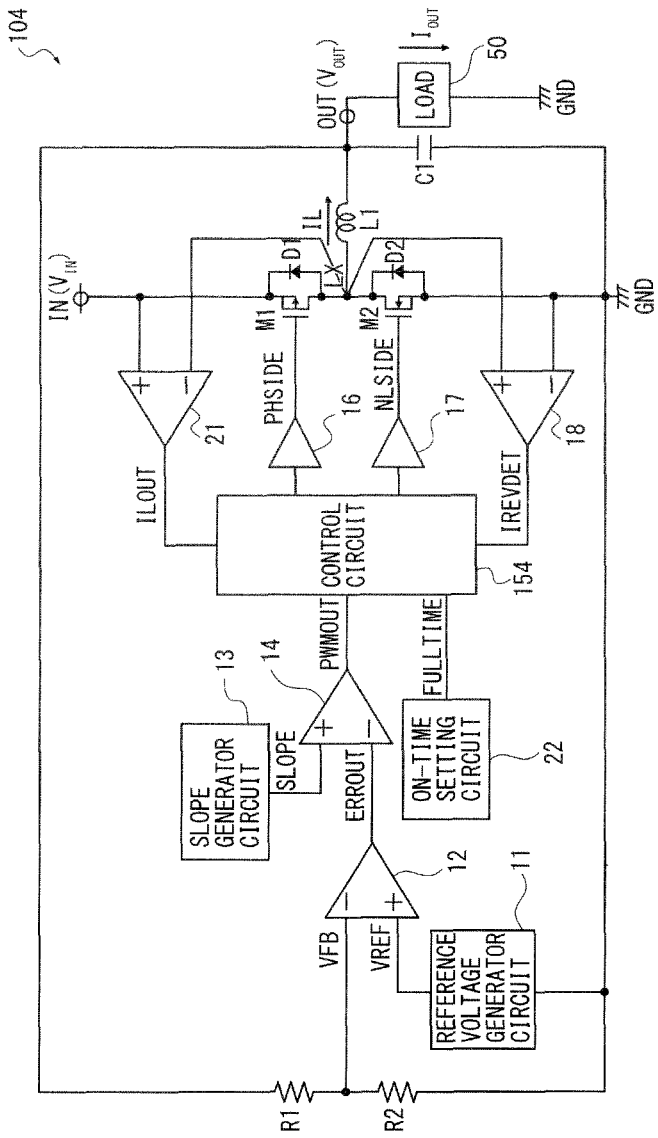
FIG. 13 shows the structure of a switching regulator 104 according to a fourth embodiment.
Figure 14:
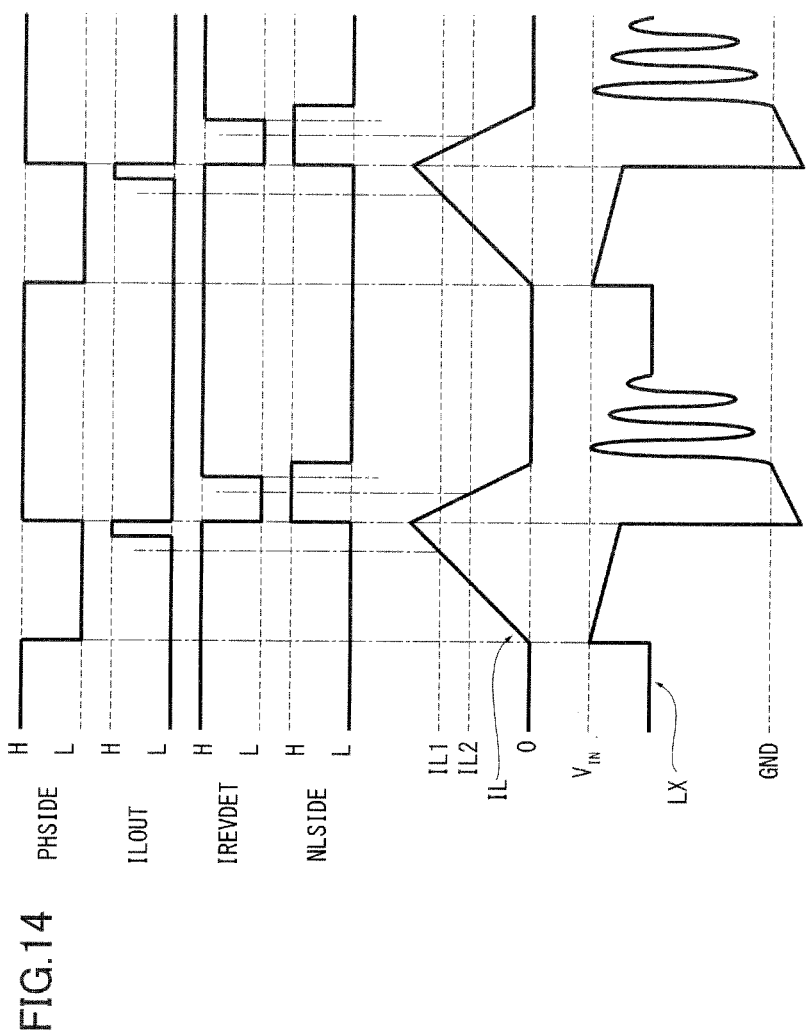
FIG. 14 is a timing chart showing a variation (waveform) in the signals of the switching regulator 104 when a difference between input voltage $V_{IN}$ and output voltage $V_{OUT}$ is not small.

Now, a switching regulator 104 according to a fourth embodiment is described with reference to FIG. 13 to FIG. 15. The switching regulator 104 is different from the switching regulator 102 of the second embodiment in that it additionally includes the on-time setting circuit 22 of the third embodiment. A detailed description thereof is thus omitted. FIG. 13 shows the structure of the switching regulator 104. FIG. 14 is a timing chart showing a variation (waveform) in the signals of the switching regulator 104 when a difference between input voltage $V_{IN}$ and output voltage $V_{OUT}$ is not small. FIG. 15 is a timing chart showing a variation (waveform) in the signals of the switching regulator 104 when a difference between the input voltage $V_{IN}$ and output voltage $V_{OUT}$ is small.

The switching regulator 104 includes the on-time setting circuit 22 in addition to the inductor current comparator 21 to set the ON time of the second switching transistor M2. The on-time setting circuit 22 is connected to a control circuit 154, monitors the time from the turning-on of the second switching transistor M2 and generates an output FULLTIME indicating that the time has reached the preset ON time T2 (FIG. 15) to the control circuit 154. The ON time T2 is set to $[[(V_{IN}-V_{OUT})/V_{IN}]/fs] \times A$ as in the third embodiment.

The control circuit 154 operates differently from the control circuit 152 in accordance with the operation of the on-time setting circuit 22. It differently generates the gate signal NLSIDE together with the low-side driver buffer circuit 17.

Specifically, when turning the gate signal PHSIDE to the first switching transistor M1 from low to high, the control circuit 154 and low-side driver buffer circuit 17 turn the gate signal NLSIDE from low to high irrespective of the determination signal ILOUT from the inductor current comparator 21. This turns on the second switching transistor M2 and continuity between the source and drain becomes established.

The control circuit 154 selects, according to the determination signal ILOUT from the inductor current comparator 21, an off-time setter to decide the timing at which the second switching transistor M2 is turned off. According to the fourth embodiment the reverse current comparator 18 and on-time setting circuit 22 are off-time setters. When changing the gate signal PHSIDE from low to high, the control circuit 154 selects the reverse current comparator 18 in response to a high determination signal ILOUT and selects the on-time setting circuit 22 in response to a low determination signal ILOUT.

In detail, at the high output TIMEOUT the control circuit 154 generates the gate signal PHSIDE on the basis of the comparator signal IREVDET's from the reverse current comparator 18. In response to the comparator signal IREVDET's turning from low to high, the control circuit 154 and low-side driver buffer circuit 17 turn the gate signal PHSIDE from low to high after a certain delay time. This turns off the second switching transistor M2 and disconnects the continuity between the source and drain. Thus, the control circuit 154 selects the reverse current comparator 18 as an off-time setter.

At the low output TIMEOUT the control circuit 154 generates the gate signal PHSIDE on the basis of the output FULLTIME from the on-time setting circuit 22. Upon receiving the output FULLTIME, the control circuit 154 and low-side driver buffer circuit 17 turn the gate signal PHSIDE from low to high. This turns off the second switching transistor M2 and disconnects the continuity between the source and drain. Thus, the control circuit 154 selects the on-time setting circuit 22 as an off-time setter.

Next, the operation of the switching regulator 104 in the fourth embodiment is described referring to the timing charts in FIGS. 14 and 15. For better understanding FIGS. 14 and 15 omit showing a variation in each signal at upstream of the control circuit 154.

By turning the gate signal PHSIDE from high to low, the first switching transistor M1 is turned on. Because of this, the switching output LX has an equal potential to that of the input voltage $V_{IN}$. Accordingly, the inductor current IL of the inductor L1 rises from zero at an inclination of $(V_{IN}-V_{OUT})/L$.

While the first switching transistor M1 is ON, the inductor current comparator 21 monitors whether the inductor current IL to the inductor L1 has reached the first current value IL1. It maintains the determination signal ILOUT low while the inductor current IL is not at the first current value IL1 and it turns the determination signal ILOUT from low to high when the inductor current IL has reached the first current value IL1. In FIG. 14 the inductor current comparator 21 turns the determination signal ILOUT from low to high in a certain delay time after the inductor current IL has reached the value IL1.

When the ON time of the first switching transistor M1 matches the OFF time threshold, the control circuit 154 and high-side driver buffer circuit 16 turn the gate signal PHSIDE from low to high to turn off the first switching transistor M1. Further, the control circuit 154 and low-side driver buffer circuit 17 turn the gate signal NLSIDE from low to high to turn on the second switching transistor M2 and decrease the switching output LX to about the ground level GND. In addition, when turning off the first switching transistor M1, the control circuit 154 selects the reverse current comparator 18 as an on-time setter because of the high determination signal ILOUT from the inductor current comparator 21.

Then, the inductor current IL decreases at an inclination of $-V_{OUT}/L$. At the inductor current IL having decreased to the second current value IL2, the reverse current comparator 18 turns the comparator signal IREVDET from low to high after a certain delay time and outputs it to the control circuit 154. The control circuit 154 and low-side driver buffer circuit 17 then turn the gate signal NLSIDE from high to low after a certain delay time to turn off the second switching transistor M2. Then, the inductor current IL passes through the parasite diode D2 of the second switching transistor M2 in the OFF state and decreases to zero. Rectified by the parasite diode D2, it remains zero, or in the discontinuous mode unless either the first or second switching transistor M1, M2 is turned on.

Thus, by selecting the reverse current comparator 18, the switching regulator 104 detects the indication of a reversal flow of the inductor current IL by a decrease of the inductor current IL to the second current value IL2 and then turns off the second switching transistor M2. Accordingly, the discontinuous mode of the inductor current IL is enabled, reducing oscillation frequency and realizing the VFM mode.

Now, the operation of the switching regulator 104 in FIG. 13 is described referring to FIG. 15.

By turning the gate signal PHSIDE from high to low, the first switching transistor M1 is turned on. Because of this, the switching output LX has an equal potential to that of the input voltage $V_{IN}$. Accordingly, the inductor current IL of the inductor L1 rises from zero at an inclination of $(V_{IN}-V_{OUT})/L$.

While the first switching transistor M1 is ON, the inductor current comparator 21 monitors whether the inductor current IL to the inductor L1 has reached the first current value IL1. It maintains the determination signal ILOUT low while the inductor current IL does not reach the first current value IL1 and it turns the determination signal ILOUT from low to high when the inductor current IL has reached the first current value IL1. In FIG. 15 the inductor current comparator 21 maintains the determination signal ILOUT low since the inductor current IL has not reached the value IL1.

When the ON time of the first switching transistor M1 matches the OFF time threshold, the control circuit 154 and high-side driver buffer circuit 16 turn the gate signal PHSIDE from low to high to turn off the first switching transistor M1. Further, the control circuit 154 and low-side driver buffer circuit 17 turn the gate signal NLSIDE from low to high to turn on the second switching transistor M2 and decrease the switching output LX to about the ground level GND. In addition the control circuit 154 selects the on-time setting circuit 22 as an on-time setter because of the low determination signal ILOUT from the inductor current comparator 21 when turning off the first switching transistor M1.

The on-time determiner circuit 22 starts counting the ON time of the first switching transistor M1 from when the gate signal NLSIDE has changed from low to high. It outputs the output FULLTIME to the control circuit 154 when the count matches the ON time T2. Upon receiving the output FULLTIME, the control circuit 154 and low-side driver buffer circuit 17 turn the gate signal NLSIDE from high to low. Thereby, the second switching transistor M2 is turned off. Here, due to the ON time T2 set as above, the inductor current IL is not zero but decreases to zero, passing through the parasite diode D2 of the second switching transistor M2 in the OFF state. Rectified by the parasite diode D2, it remains zero, or in the discontinuous mode, unless either the first or second switching transistor M1, M2 is turned on.

Thus, in the switching regulator 104, by selecting the on-time setting circuit 22, the second switching transistor M2 is turned off when the ON time T2 has elapsed. This can surely prevent the reversal flow of the inductor current IL, realizing a desired discontinuous mode of the inductor current IL and lowering the oscillation frequency to a desired value to realize the VFM mode.

According to the switching regulator 104, it is able to reliably prevent a reversal flow of the inductor current IL even when the difference between the input voltage $V_{IN}$ to the input terminal IN and the output voltage $V_{OUT}$ from the output terminal OUT is small. According to the present embodiment, at the timing when the first switching transistor M1 is turned on, the inductor current comparator 21 determines whether or not the inductor current IL has reached the first current value IL1. The first current value IL1 is set so that the inductor current IL exceeds the second current value IL2 when the second switching transistor M2 is turned on, with the delay time of the inductor current comparator 21 taken into consideration. Therefore, at the inductor current IL having not reached the first current value IL1, the inductor current IL is smaller than the second current value IL2 at the turning-on of the second switching transistor M2. In view of this, if the inductor current IL has not reached the first current value IL1, the on-time setting circuit 22 is used and the second switching transistor M2 is placed in the ON state for the ON time T2 and then turned off. Thereby, the inductor current IL is prevented from reversely flowing. The second switching transistor M2 can be turned off before the reversal flow of the inductor current IL even when the difference between the input voltage $V_{IN}$ and the output voltage $V_{OUT}$ is small. Thus, the reversal flow of the inductor current IL can be reliably prevented.

The ON time T2 is set to be able to place the second switching transistor M2 in the ON state for the longest time while preventing the reversal flow of the inductor current IL. Because of this, with a small difference between the input voltage $V_{IN}$ and the output voltage $V_{OUT}$, the second switching transistor M2 can be ON for as long time as possible without the occurrence of the reversal flow of the inductor current IL. A loss of a rectified inductor current IL by a resistance during the ON state of the second switching transistor M2 is smaller than that by the parasite diode D2. Thus, the efficiency of the switching regulator 104 at a small difference between the input voltage $V_{IN}$ and the output voltage $V_{OUT}$ can be improved, improving the overall efficiency.

Since the inductor current IL can be reliably prevented from reversing, the switching regulator 104 can decrease oscillation frequency as desired and realize the VFM mode. Further, it can improve efficiency during a small load.

Further, when the inductor current IL has reached the first current value IL1, the reverse current comparator 18 is used and the second switching transistor M2 is turned off by a decrease of the inductor current IL to the second current value IL2. Also, the first current value IL1 is set so that the inductor current IL becomes larger than the second current value IL2 at the turning-on of the second switching transistor M2 with the certain delay time taken into account. In other words, at the turning-on of the second switching transistor M2, the inductor current IL having reached the first current value IL1 is larger than the second current value IL2. Thus, in the switching regulator 104 the inductor current IL can be prevented from reversing even when the second switching transistor M2 is turned off by the reverse current comparator 18. Further, the inductor current IL can flow through the second switching transistor M2 in the ON state and a reversal thereof through the second switching transistor M2 can be prevented. Thus, the overall efficiency of the switching regulator 104 can be improved because a loss of a rectified inductor current IL by a resistance during the ON state of the second switching transistor M2 is smaller than that by the parasite diode D2.

The switching regulator 104 can be a simple structure including the on-time determiner circuit 22 and the inductor current comparator 21 provided to connect a point between the input terminal IN and the first switching transistor M1, the switching output LX and the control circuit 154, contributing to cost reduction.

Further, the control circuit 154 is configured to select the OFF time setter to turn off the second switching transistor M2 in accordance with the output (determination signal ILOUT in the fourth embodiment) of the inductor current comparator 21 and change the timing at which the second switching transistor M2 is turned off. That is, the switching regulator 104 changes the switching of the second switching transistor M2 on the basis of a monitoring result from the inductor current comparator 21. Thus, the switching regulator 104 can be a simple structure additionally including the inductor current comparator 21 and on-time setting circuit 22 with the setting of the control circuit 154 changed, which realizes cost reduction.

According to the switching regulator 104, it has only to set the first current value IL1 of the inductor current comparator 21 and the ON time T2 of the on-time setting circuit 22 in advance so that a reversal flow of the inductor current IL can be securely prevented while various set values of the other elements can be freely dealt with. This can greatly contribute to increasing the degree of freedom in which the switching regulator 104 is designed and facilitating the design of the switching regulator 104.

Accordingly, the switching regulator 104 according to the fourth embodiment can prevent the occurrence of reverse current in the inductor L1 irrespective of the condition of the input voltage $V_{IN}$ and output voltage $V_{OUT}$ and improve the efficiency during a small load.

The present invention should not be limited to the switching regulators 10, 102, 103, 104 as exemplified in the above. It can be arbitrarily configured as long as it comprises a pair of a first switching element and a second switching element to be switched over to convert an input voltage to a certain constant voltage, and an operation monitor to monitor an operation state of the first switching element, in which a switching of the second switching element is changed according to a result of the monitoring by the operation monitor.

The above embodiments have described the structure as an example comprising the first and second switching transistors M1, M2 in a pair including the parasite diodes D1 and D2, respectively. However, the present invention should not be limited to such an example. It can be arbitrarily configured as long as it comprises a pair of switching elements which include at least an electric element for switching operation and an electric element for rectifying. A switching element comprising a rectifying element such as diode arranged in parallel to the first switching transistor M1 (second switching transistor M2), one comprising a bipolar transistor in place of a field effect transistor, and one comprising a number of electric elements for switching and rectifying properly connected in serial or parallel are exemplified.

Further, the above embodiments have described an example where the first switching transistor M1 as a first switching element is turned on by a low gate signal PHSIDE and turned off by a high gate signal PHSIDE. Alternatively, the first switching transistor M1 can be configured to be turned on by a high gate signal PHSIDE and turned off by a low gate signal PHSIDE.

The above embodiments have described an example where the second switching transistor M2 as a second switching element is turned on by a high gate signal NLSIDE and turned off by a low gate signal NLSIDE. Alternatively, the second switching transistor M2 can be configured to be turned on by a low gate signal NLSIDE and turned off by a high gate signal NLSIDE.

The above embodiments have described the on-time determiner circuit 19 and inductor current comparator 21 as operation monitors. The operation monitor can be arbitrarily configured as long as it can monitor the operation state of the first switching transistor M1 in order to detect the indication of a reversal flow of the inductor current IL when the second switching transistor M2 is turned off by the reverse current comparator 18.

The first and third embodiment have described an example where the on-time determiner circuit 19 changes the output TIMEOUT from low to high when the ON time from the turning of the gate signal PHSIDE from high to low exceeds the determination time T1. Alternatively, the on-time determiner circuit 19 can be configured to change the output TIMEOUT from high to low when the ON time from exceeds the determination time T1.

The second and fourth embodiments have described an example where the inductor current comparator 21 changes the determination signal ILOUT from low to high when the inductor current IL has reached the first current value IL1. Alternatively, the inductor current comparator 21 can be configured to change the determination signal ILOUT from high to low when the inductor current IL has reached the first current value IL1.

The third and fourth embodiments have described the reverse current comparator 18 and on-time setting circuit 22 as the off-time setters by way of example. Alternatively, the configuration thereof can be an arbitrarily decided as long as two or more off-time setters are provided to change the switching of the second switching transistor M2 according to a monitoring result of the operation of the first switching transistor M1 by the operation monitor.

The third and fourth embodiments have described an example where the ON time T2 is set to $[[(V_{IN}-V_{OUT})/V_{IN}]/fs] \times A$. Alternatively, it can be set to an arbitrary value as long as the inductor current IL is prevented from reversing.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A switching regulator comprising:
a first switching element and a second switching element in a pair to be switched over to convert an input voltage to a certain constant voltage; and
an operation monitor to monitor an operation state of the first switching element, wherein a switching of the second switching element is changed according to a result of the monitoring by the operation monitor,
wherein the operation monitor is an on-time judgment circuit to judge whether or not an ON time of the first switching element has reached a preset judgment time and to change high and low of an output signal,
wherein if the on-time judgment circuit judges that the ON time of the first switching element has reached the preset judgment time, the second switching element is not turned on after the first switching element is turned off, and
wherein if the on-time judgment circuit judges that the ON time of the first switching element has not reached the preset judgment time, the second switching element is turned on after the first switching element is turned off.

2. A switching regulator comprising:
a first switching element and a second switching element in a pair to be switched over to convert an input voltage to a certain constant voltage;
an operation monitor to monitor an operation state of the first switching element, wherein a switching of the second switching element is changed according to a result of the monitoring by the operation monitor, and
wherein the operation monitor is an on-time judgment circuit to judge whether or not an ON time of the first switching element has reached a preset judgment time and to change high and low of an output signal; and
at least two off-time setters to determine a timing at which the second switching element is turned off, wherein
one of the off-time setters is selected according to a result of the judgement of the ON time of the first switching element by the on-time judgement circuit, and the second switching element is turned off in accordance with the selected off-time setter.

3. A switching regulator comprising:
a first switching element and a second switching element in a pair to be switched over to convert an input voltage to a certain constant voltage;
an operation monitor to monitor an operation state of the first switching element, wherein a switching of the second switching element is changed according to a result of the monitoring by the operation monitor; and
a smoothing circuit including an inductor and a condenser, to smoothen an output voltage, wherein the operation monitor is an inductor current judgment circuit to judge whether or not a value of current flowing into the inductor has reached a preset judgment value and to change high and low of an output signal,
wherein if the inductor current judgment circuit judges that the current value has not reached the preset judgment value, the second switching element is not turned on after the first switching element is turned off, and
wherein if the inductor current judgment circuit judges that the current value has reached the preset judgment value, the second switching element is turned on after the first switching element is turned off.

4. A switching regulator comprising:
a first switching element and a second switching element in a pair to be switched over to convert an input voltage to a certain constant voltage;
an operation monitor to monitor an operation state of the first switching element, wherein a switching of the second switching element is changed according to a result of the monitoring by the operation monitor;
a smoothing circuit including an inductor and a condenser, to smoothen an output voltage, wherein the operation monitor is an inductor current judgment circuit to judge whether or not a value of current flowing into the inductor has reached a preset judgment value and to change high and low of an output signal; and
at least two off-time setters to determine timing at which the second switching element is turned off, wherein
one of the off-time setters is selected according to a result of the judgment of the current value of the inductor by the inductor current determiner circuit, and the second switching element is turned off in accordance with the selected off-time setter.

\* \* \* \* \*